United States Patent
Liess

(10) Patent No.: US 10,837,495 B2
(45) Date of Patent: Nov. 17, 2020

(54) TOOL COUPLER WITH THREADED CONNECTION FOR TOP DRIVE

(71) Applicant: Weatherford Technology Holdings, LLC, Houston, TX (US)

(72) Inventor: Martin Liess, Seelze (DE)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 285 days.

(21) Appl. No.: 15/806,560

(22) Filed: Nov. 8, 2017

(65) Prior Publication Data
US 2018/0258999 A1 Sep. 13, 2018

Related U.S. Application Data

(62) Division of application No. 15/457,572, filed on Mar. 13, 2017, now Pat. No. 10,247,246.

(51) Int. Cl.
| | | |
|---|---|---|
| E21B 3/02 | (2006.01) | |
| F16D 1/10 | (2006.01) | |
| F16D 1/092 | (2006.01) | |
| E21B 41/00 | (2006.01) | |
| E21B 19/16 | (2006.01) | |
| E21B 19/08 | (2006.01) | |

(Continued)

(52) U.S. Cl.
CPC .............. *F16D 1/10* (2013.01); *E21B 3/02* (2013.01); *E21B 17/04* (2013.01); *E21B 19/08* (2013.01); *E21B 19/16* (2013.01); *E21B 41/00* (2013.01); *F16D 1/092* (2013.01); *F16D 1/112* (2013.01); *F16D 2001/103* (2013.01)

(58) Field of Classification Search
CPC . E21B 3/02; E21B 17/04; E21B 19/08; E21B 19/16; E21B 41/00; F16D 2001/103
See application file for complete search history.

(56) References Cited

U.S. PATENT DOCUMENTS

| | | |
|---|---|---|
| 1,367,156 A | 2/1921 | McAlvay et al. |
| 1,610,977 A | 12/1926 | Scott |
| 1,822,444 A | 9/1931 | MacClatchie |

(Continued)

FOREIGN PATENT DOCUMENTS

| | | |
|---|---|---|
| AU | 2012201644 A1 | 4/2012 |
| AU | 2011244894 A1 | 5/2013 |

(Continued)

OTHER PUBLICATIONS

Bosch Rexroth AG, Electric Drives and Controls, Brochure, "Asynchronous high-speed motors 1MB for high speeds," 6 pages.

(Continued)

*Primary Examiner* — Taras P Bemko
*Assistant Examiner* — Yanick A Akaragwe
(74) *Attorney, Agent, or Firm* — Patterson + Sheridan, LLP

(57) ABSTRACT

A drive unit includes a drive stem having first friction surfaces and a load coupling, wherein the load coupling is a threaded coupling. The drive unit also includes a transmission unit having second friction surfaces parallel to the first friction surfaces; and shoulders proximate a bottom of the transmission unit. The drive unit further includes a transmission selector movable to an "on" position or an "off" position, wherein the drive stem moves synchronously with the transmission unit when the transmission selector is in the "on" position.

20 Claims, 19 Drawing Sheets

(51) Int. Cl.
*F16D 1/112* (2006.01)
*E21B 17/04* (2006.01)

(56) References Cited

U.S. PATENT DOCUMENTS

| | | |
|---|---|---|
| 2,370,354 A | 2/1945 | Hurst |
| 3,144,085 A * | 8/1964 | Hasha .................... E21B 19/16 173/164 |
| 3,147,992 A | 9/1964 | Haeber et al. |
| 3,354,951 A | 11/1967 | Savage et al. |
| 3,385,370 A | 5/1968 | Knox et al. |
| 3,662,842 A | 5/1972 | Bromell |
| 3,698,426 A | 10/1972 | Litchfield et al. |
| 3,747,675 A | 7/1973 | Brown |
| 3,766,991 A | 10/1973 | Brown |
| 3,774,697 A | 11/1973 | Brown |
| 3,776,320 A | 12/1973 | Brown |
| 3,842,619 A | 10/1974 | Bychurch, Sr. |
| 3,888,318 A | 6/1975 | Brown |
| 3,899,024 A | 8/1975 | Tonnelli et al. |
| 3,913,687 A | 10/1975 | Gyongyosi et al. |
| 3,915,244 A | 10/1975 | Brown |
| 3,964,552 A | 6/1976 | Slator |
| 4,022,284 A | 5/1977 | Crow |
| 4,051,587 A | 10/1977 | Boyadjieff |
| 4,100,968 A | 7/1978 | Delano |
| 4,192,155 A | 3/1980 | Gray |
| 4,199,847 A | 4/1980 | Owens |
| 4,235,469 A | 11/1980 | Denny et al. |
| 4,364,407 A | 12/1982 | Hilliard |
| 4,377,179 A | 3/1983 | Giebeler |
| 4,402,239 A | 9/1983 | Mooney |
| 4,449,596 A | 5/1984 | Boyadjieff |
| 4,478,244 A | 10/1984 | Garrett |
| 4,497,224 A | 2/1985 | Jurgens |
| 4,593,773 A | 6/1986 | Skeie |
| 4,762,187 A | 8/1988 | Haney |
| 4,776,617 A | 10/1988 | Sato |
| 4,779,688 A | 10/1988 | Baugh |
| 4,791,997 A | 12/1988 | Krasnov |
| 4,813,493 A | 3/1989 | Shaw et al. |
| 4,815,546 A | 3/1989 | Haney et al. |
| 4,821,814 A | 4/1989 | Willis et al. |
| 4,844,181 A | 7/1989 | Bassinger |
| 4,867,236 A | 9/1989 | Haney et al. |
| 4,955,949 A | 9/1990 | Bailey et al. |
| 4,962,819 A | 10/1990 | Bailey et al. |
| 4,972,741 A | 11/1990 | Sibille |
| 4,981,180 A | 1/1991 | Price |
| 4,997,042 A | 3/1991 | Jordan et al. |
| 5,036,927 A | 8/1991 | Willis |
| 5,099,725 A | 3/1992 | Bouligny, Jr. et al. |
| 5,152,554 A | 10/1992 | LaFleur et al. |
| 5,172,940 A | 12/1992 | Usui et al. |
| 5,191,939 A | 3/1993 | Stokley |
| 5,215,153 A | 6/1993 | Younes |
| 5,245,877 A | 9/1993 | Ruark |
| 5,282,653 A | 2/1994 | LaFleur et al. |
| 5,297,833 A | 3/1994 | Willis et al. |
| 5,348,351 A | 9/1994 | LaFleur et al. |
| 5,385,514 A | 1/1995 | Dawe |
| 5,433,279 A | 7/1995 | Tessari et al. |
| 5,441,310 A | 8/1995 | Barrett et al. |
| 5,456,320 A | 10/1995 | Baker |
| 5,479,988 A | 1/1996 | Appleton |
| 5,486,223 A | 1/1996 | Carden |
| 5,501,280 A | 3/1996 | Brisco |
| 5,509,442 A | 4/1996 | Claycomb |
| 5,577,566 A | 11/1996 | Albright et al. |
| 5,584,343 A | 12/1996 | Coone |
| 5,645,131 A | 7/1997 | Trevisani |
| 5,664,310 A | 9/1997 | Penisson |
| 5,682,952 A | 11/1997 | Stokley |
| 5,735,348 A | 4/1998 | Hawkins, III |
| 5,778,742 A | 7/1998 | Stuart |
| 5,839,330 A | 11/1998 | Stokka |
| 5,909,768 A | 6/1999 | Castille et al. |
| 5,918,673 A | 7/1999 | Hawkins et al. |
| 5,950,724 A | 9/1999 | Giebeler |
| 5,971,079 A | 10/1999 | Mullins |
| 5,992,520 A | 11/1999 | Schultz et al. |
| 6,003,412 A | 12/1999 | Dlask et al. |
| 6,053,191 A | 4/2000 | Hussey |
| 6,102,116 A | 8/2000 | Giovanni |
| 6,142,545 A | 11/2000 | Penman et al. |
| 6,161,617 A | 12/2000 | Gjedebo |
| 6,173,777 B1 | 1/2001 | Mullins |
| 6,276,450 B1 | 8/2001 | Seneviratne |
| 6,279,654 B1 | 8/2001 | Mosing et al. |
| 6,289,911 B1 | 9/2001 | Majkovic |
| 6,309,002 B1 | 10/2001 | Bouligny |
| 6,311,792 B1 | 11/2001 | Scott et al. |
| 6,328,343 B1 | 12/2001 | Hosie et al. |
| 6,378,630 B1 | 4/2002 | Ritorto et al. |
| 6,390,190 B2 | 5/2002 | Mullins |
| 6,401,811 B1 | 6/2002 | Coone |
| 6,415,862 B1 | 7/2002 | Mullins |
| 6,431,626 B1 | 8/2002 | Bouligny |
| 6,443,241 B1 | 9/2002 | Juhasz et al. |
| 6,460,620 B1 | 10/2002 | LaFleur |
| 6,527,047 B1 | 3/2003 | Pietras |
| 6,536,520 B1 * | 3/2003 | Snider .................... E21B 19/07 166/78.1 |
| 6,571,876 B2 | 6/2003 | Szarka |
| 6,578,632 B2 | 6/2003 | Mullins |
| 6,595,288 B2 | 7/2003 | Mosing et al. |
| 6,604,578 B2 | 8/2003 | Mullins |
| 6,622,796 B1 | 9/2003 | Pietras |
| 6,637,526 B2 | 10/2003 | Juhasz et al. |
| 6,640,824 B2 | 11/2003 | Majkovic |
| 6,666,273 B2 | 12/2003 | Laurel |
| 6,675,889 B1 | 1/2004 | Mullins et al. |
| 6,679,333 B2 | 1/2004 | York et al. |
| 6,688,398 B2 | 2/2004 | Pietras |
| 6,691,801 B2 | 2/2004 | Juhasz et al. |
| 6,705,405 B1 | 3/2004 | Pietras |
| 6,715,542 B2 | 4/2004 | Mullins |
| 6,719,046 B2 | 4/2004 | Mullins |
| 6,722,425 B2 | 4/2004 | Mullins |
| 6,725,938 B1 | 4/2004 | Pietras |
| 6,732,819 B2 | 5/2004 | Wenzel |
| 6,732,822 B2 | 5/2004 | Slack et al. |
| 6,742,584 B1 | 6/2004 | Appleton |
| 6,742,596 B2 | 6/2004 | Haugen |
| 6,779,599 B2 | 8/2004 | Mullins et al. |
| 6,832,656 B2 | 12/2004 | Fournier, Jr. et al. |
| 6,883,605 B2 | 4/2005 | Arceneaux et al. |
| 6,892,835 B2 | 5/2005 | Shahin et al. |
| 6,908,121 B2 | 6/2005 | Hirth et al. |
| 6,925,807 B2 | 8/2005 | Jones et al. |
| 6,938,697 B2 | 9/2005 | Haugen |
| 6,976,298 B1 | 12/2005 | Pietras |
| 6,994,176 B2 | 2/2006 | Shahin et al. |
| 7,000,503 B2 | 2/2006 | Dagenais et al. |
| 7,001,065 B2 | 2/2006 | Dishaw et al. |
| 7,004,259 B2 | 2/2006 | Pietras |
| 7,007,753 B2 | 3/2006 | Robichaux et al. |
| 7,017,671 B2 | 3/2006 | Williford |
| 7,021,374 B2 | 4/2006 | Pietras |
| 7,025,130 B2 | 4/2006 | Bailey et al. |
| 7,073,598 B2 | 7/2006 | Haugen |
| 7,090,021 B2 | 8/2006 | Pietras |
| 7,096,948 B2 | 8/2006 | Mosing et al. |
| 7,114,235 B2 | 10/2006 | Jansch et al. |
| 7,128,161 B2 | 10/2006 | Pietras |
| 7,137,454 B2 | 11/2006 | Pietras |
| 7,140,443 B2 | 11/2006 | Beierbach et al. |
| 7,143,849 B2 | 12/2006 | Shahin et al. |
| 7,147,254 B2 | 12/2006 | Niven et al. |
| 7,159,654 B2 | 1/2007 | Ellison et al. |
| 7,178,612 B2 | 2/2007 | Belik |
| 7,213,656 B2 | 5/2007 | Pietras |
| 7,219,744 B2 | 5/2007 | Pietras |
| 7,231,969 B2 | 6/2007 | Folk et al. |

(56) References Cited

U.S. PATENT DOCUMENTS

| | | |
|---|---|---|
| 7,270,189 B2 | 9/2007 | Brown et al. |
| 7,281,451 B2 | 10/2007 | Schulze Beckinghausen |
| 7,281,587 B2 | 10/2007 | Haugen |
| 7,303,022 B2 | 12/2007 | Tilton et al. |
| 7,325,610 B2 | 2/2008 | Giroux et al. |
| 7,353,880 B2 | 4/2008 | Pietras |
| 7,448,456 B2 | 11/2008 | Shahin et al. |
| 7,451,826 B2 | 11/2008 | Pietras |
| 7,490,677 B2 | 2/2009 | Buytaert et al. |
| 7,503,397 B2 | 3/2009 | Giroux et al. |
| 7,509,722 B2 | 3/2009 | Shahin et al. |
| 7,513,300 B2 | 4/2009 | Pietras et al. |
| 7,591,304 B2 | 9/2009 | Juhasz et al. |
| 7,617,866 B2 | 11/2009 | Pietras |
| 7,635,026 B2 | 12/2009 | Mosing et al. |
| 7,665,515 B2 | 2/2010 | Mullins |
| 7,665,530 B2 | 2/2010 | Wells et al. |
| 7,665,531 B2 | 2/2010 | Pietas |
| 7,669,662 B2 | 3/2010 | Pietras |
| 7,690,422 B2 | 4/2010 | Swietlik et al. |
| 7,694,730 B2 | 4/2010 | Angman |
| 7,694,744 B2 | 4/2010 | Shahin |
| 7,699,121 B2 | 4/2010 | Juhasz et al. |
| 7,730,698 B1 | 4/2010 | Janssen et al. |
| 7,712,523 B2 | 5/2010 | Snider et al. |
| 7,757,759 B2 | 7/2010 | Jahn et al. |
| 7,779,922 B1 | 8/2010 | Harris et al. |
| 7,793,719 B2 | 9/2010 | Snider et al. |
| 7,817,062 B1 | 10/2010 | Li et al. |
| 7,828,085 B2 | 11/2010 | Kuttel et al. |
| 7,841,415 B2 | 11/2010 | Winter |
| 7,854,265 B2 | 12/2010 | Zimmermann |
| 7,866,390 B2 | 1/2011 | Latiolais, Jr. et al. |
| 7,874,352 B2 | 1/2011 | Odell, II et al. |
| 7,874,361 B2 | 1/2011 | Mosing et al. |
| 7,878,237 B2 | 2/2011 | Angman |
| 7,878,254 B2 | 2/2011 | Abdollahi et al. |
| 7,882,902 B2 | 2/2011 | Boutwell, Jr. |
| 7,896,084 B2 | 3/2011 | Haugen |
| 7,918,273 B2 | 4/2011 | Snider et al. |
| 7,958,787 B2 | 6/2011 | Hunter |
| 7,971,637 B2 | 7/2011 | Duhon et al. |
| 7,975,768 B2 | 7/2011 | Fraser et al. |
| 8,118,106 B2 | 2/2012 | Wiens et al. |
| 8,141,642 B2 | 3/2012 | Distad et al. |
| 8,210,268 B2 | 7/2012 | Heidecke et al. |
| 8,281,856 B2 | 10/2012 | Jahn et al. |
| 8,307,903 B2 | 11/2012 | Redlinger et al. |
| 8,365,834 B2 | 2/2013 | Liess et al. |
| 8,459,361 B2 | 6/2013 | Leuchtenberg |
| 8,505,984 B2 | 8/2013 | Henderson et al. |
| 8,567,512 B2 | 10/2013 | Odell, II et al. |
| 8,601,910 B2 | 12/2013 | Begnaud |
| 8,636,067 B2 | 1/2014 | Robichaux et al. |
| 8,651,175 B2 | 2/2014 | Fallen |
| 8,668,003 B2 | 3/2014 | Osmundsen et al. |
| 8,708,055 B2 | 4/2014 | Liess et al. |
| 8,727,021 B2 | 5/2014 | Heidecke et al. |
| 8,776,898 B2 | 7/2014 | Liess et al. |
| 8,783,339 B2 | 7/2014 | Sinclair et al. |
| 8,839,884 B2 | 9/2014 | Kuttel et al. |
| 8,893,772 B2 | 11/2014 | Henderson et al. |
| 9,068,406 B2 | 6/2015 | Clasen et al. |
| 9,206,851 B2 | 12/2015 | Slaughter, Jr. et al. |
| 9,528,326 B2 | 12/2016 | Heidecke et al. |
| 9,631,438 B2 | 4/2017 | McKay |
| 2002/0043403 A1 | 4/2002 | Juhasz et al. |
| 2002/0074132 A1 | 6/2002 | Juhasz et al. |
| 2002/0084069 A1 | 7/2002 | Mosing et al. |
| 2002/0129934 A1 | 9/2002 | Mullins et al. |
| 2002/0170720 A1 | 11/2002 | Haugen |
| 2003/0098150 A1 | 5/2003 | Andreychuk |
| 2003/0107260 A1 | 6/2003 | Ording et al. |
| 2003/0221519 A1 | 12/2003 | Haugen |
| 2004/0003490 A1 | 1/2004 | Shahin et al. |
| 2004/0069497 A1 | 4/2004 | Jones et al. |
| 2004/0216924 A1 | 11/2004 | Pietras et al. |
| 2005/0000691 A1 | 1/2005 | Giroux et al. |
| 2005/0173154 A1 | 8/2005 | Lesko |
| 2005/0206163 A1 | 9/2005 | Guesnon et al. |
| 2005/0257933 A1 | 11/2005 | Pietras |
| 2005/0269072 A1 | 12/2005 | Folk et al. |
| 2005/0269104 A1 | 12/2005 | Folk et al. |
| 2005/0269105 A1 | 12/2005 | Pietras |
| 2005/0274508 A1 | 12/2005 | Folk et al. |
| 2006/0037784 A1 | 2/2006 | Walter et al. |
| 2006/0124353 A1 | 6/2006 | Juhasz et al. |
| 2006/0151181 A1 | 7/2006 | Shahin |
| 2006/0180315 A1 | 8/2006 | Shahin et al. |
| 2007/0030167 A1 | 2/2007 | Li et al. |
| 2007/0044973 A1 | 3/2007 | Fraser et al. |
| 2007/0074588 A1 | 4/2007 | Harata et al. |
| 2007/0074874 A1 | 4/2007 | Richardson |
| 2007/0102992 A1 | 5/2007 | Jager |
| 2007/0131416 A1 | 6/2007 | Odell, II et al. |
| 2007/0140801 A1 | 6/2007 | Kuttel et al. |
| 2007/0144730 A1 | 6/2007 | Shahin et al. |
| 2007/0158076 A1 | 7/2007 | Hollingsworth, Jr. et al. |
| 2007/0251699 A1 | 11/2007 | Wells et al. |
| 2007/0251701 A1 | 11/2007 | Jahn et al. |
| 2007/0257811 A1 | 11/2007 | Hall et al. |
| 2008/0059073 A1 | 3/2008 | Giroux et al. |
| 2008/0093127 A1 | 4/2008 | Angman |
| 2008/0099196 A1 | 5/2008 | Latiolais et al. |
| 2008/0125876 A1 | 5/2008 | Boutwell |
| 2008/0202812 A1 | 8/2008 | Childers et al. |
| 2008/0308281 A1 | 12/2008 | Boutwell, Jr. et al. |
| 2009/0151934 A1 | 6/2009 | Heidecke et al. |
| 2009/0159294 A1 | 6/2009 | Abdollahi et al. |
| 2009/0200038 A1 | 8/2009 | Swietlik et al. |
| 2009/0205820 A1 | 8/2009 | Koederitz et al. |
| 2009/0205827 A1 | 8/2009 | Swietlik et al. |
| 2009/0205836 A1 | 8/2009 | Swietlik et al. |
| 2009/0205837 A1 | 8/2009 | Swietlik et al. |
| 2009/0229837 A1 | 9/2009 | Wiens et al. |
| 2009/0266532 A1 | 10/2009 | Revheim et al. |
| 2009/0272537 A1 | 11/2009 | Alikin et al. |
| 2009/0274544 A1 | 11/2009 | Liess |
| 2009/0274545 A1 | 11/2009 | Liess et al. |
| 2009/0316528 A1 | 12/2009 | Ramshaw et al. |
| 2009/0321086 A1 | 12/2009 | Zimmermann |
| 2010/0032162 A1 | 2/2010 | Olstad et al. |
| 2010/0101805 A1 | 4/2010 | Angelle et al. |
| 2010/0200222 A1 | 8/2010 | Robichaux et al. |
| 2010/0206583 A1 | 8/2010 | Swietlik et al. |
| 2010/0206584 A1 | 8/2010 | Clubb et al. |
| 2010/0236777 A1 | 9/2010 | Partouche et al. |
| 2011/0036586 A1 | 2/2011 | Hart et al. |
| 2011/0039086 A1 | 2/2011 | Graham et al. |
| 2011/0088495 A1 | 4/2011 | Buck et al. |
| 2011/0214919 A1 | 9/2011 | McClung, III |
| 2011/0280104 A1 | 11/2011 | McClung, III |
| 2012/0048574 A1 | 3/2012 | Wiens et al. |
| 2012/0152530 A1 | 6/2012 | Wiedecke et al. |
| 2012/0160517 A1 | 6/2012 | Bouligny et al. |
| 2012/0212326 A1 | 8/2012 | Christiansen et al. |
| 2012/0234107 A1 | 9/2012 | Pindiprolu et al. |
| 2012/0298376 A1 | 11/2012 | Twardowski |
| 2013/0055858 A1 | 3/2013 | Richardson |
| 2013/0056977 A1 | 3/2013 | Henderson et al. |
| 2013/0062074 A1 | 3/2013 | Angelle et al. |
| 2013/0075077 A1 | 3/2013 | Henderson et al. |
| 2013/0075106 A1 | 3/2013 | Tran et al. |
| 2013/0105178 A1 | 5/2013 | Pietas |
| 2013/0207382 A1 | 8/2013 | Robichaux |
| 2013/0207388 A1 | 8/2013 | Jansson et al. |
| 2013/0233624 A1 | 9/2013 | In |
| 2013/0269926 A1 | 10/2013 | Liess et al. |
| 2013/0271576 A1 | 10/2013 | Elllis |
| 2013/0275100 A1 | 10/2013 | Ellis et al. |
| 2013/0299247 A1 | 11/2013 | Küttel et al. |
| 2014/0090856 A1 | 4/2014 | Pratt et al. |
| 2014/0116686 A1 | 5/2014 | Odell, II et al. |
| 2014/0131052 A1 | 5/2014 | Richardson |

(56) References Cited

U.S. PATENT DOCUMENTS

| | | |
|---|---|---|
| 2014/0202767 A1 | 7/2014 | Feasey |
| 2014/0233804 A1 | 8/2014 | Gustaysson et al. |
| 2014/0262521 A1 | 9/2014 | Bradley et al. |
| 2014/0305662 A1 | 10/2014 | Giroux et al. |
| 2014/0326468 A1 | 11/2014 | Heidecke et al. |
| 2014/0352944 A1 | 12/2014 | Devarajan et al. |
| 2014/0360780 A1 | 12/2014 | Moss et al. |
| 2015/0014063 A1 | 1/2015 | Simanjuntak et al. |
| 2015/0053424 A1 | 2/2015 | Wiens et al. |
| 2015/0083391 A1 | 3/2015 | Bangert et al. |
| 2015/0107385 A1 | 4/2015 | Mullins et al. |
| 2015/0337648 A1 | 11/2015 | Zippel et al. |
| 2016/0024862 A1* | 1/2016 | Wilson .................. E21B 17/042 166/380 |
| 2016/0138348 A1 | 5/2016 | Kunec |
| 2016/0145954 A1 | 5/2016 | Helms et al. |
| 2016/0177639 A1 | 6/2016 | McIntosh et al. |
| 2016/0215592 A1 | 7/2016 | Helms et al. |
| 2016/0230481 A1 | 8/2016 | Misson et al. |
| 2017/0037683 A1 | 2/2017 | Heidecke et al. |
| 2017/0044854 A1 | 2/2017 | Hebebrand et al. |
| 2017/0044875 A1 | 2/2017 | Hebebrand et al. |
| 2017/0051568 A1 | 2/2017 | Wern et al. |
| 2017/0067303 A1 | 3/2017 | Thiemann et al. |
| 2017/0067320 A1 | 3/2017 | Zouhair et al. |
| 2017/0074075 A1 | 3/2017 | Liess |
| 2017/0211327 A1 | 7/2017 | Wern et al. |
| 2017/0211343 A1 | 7/2017 | Thiemann |
| 2017/0284164 A1 | 10/2017 | Holmes et al. |

FOREIGN PATENT DOCUMENTS

| | | |
|---|---|---|
| AU | 2013205714 A1 | 5/2013 |
| AU | 2014215938 A1 | 9/2014 |
| CA | 2 707 050 A1 | 6/2009 |
| CA | 2 841 654 A1 | 8/2015 |
| CA | 2 944 327 A1 | 10/2015 |
| DE | 102007016822 A1 | 10/2008 |
| EP | 0 250 072 A2 | 12/1987 |
| EP | 1 619 349 A2 | 1/2006 |
| EP | 1 772 715 A2 | 4/2007 |
| EP | 1 961 912 A1 | 8/2008 |
| EP | 1 961 913 A1 | 8/2008 |
| EP | 1961912 A1 | 8/2008 |
| EP | 1961913 A1 | 8/2008 |
| EP | 2085566 A2 | 8/2009 |
| EP | 2 322 357 A1 | 5/2011 |
| EP | 3032025 A1 | 6/2016 |
| FR | 2531479 A1 | 2/1984 |
| GB | 1487948 A | 10/1977 |
| GB | 2 077 812 A | 12/1981 |
| GB | 2 180 027 A | 3/1987 |
| GB | 2 228 025 A | 8/1990 |
| GB | 2 314 391 A | 12/1997 |
| WO | 2004/079153 A2 | 9/2004 |
| WO | 2004/101417 A2 | 11/2004 |
| WO | 2007/001887 A1 | 1/2007 |
| WO | 2007/070805 A2 | 6/2007 |
| WO | 2007127737 A2 | 11/2007 |
| WO | 2008005767 A1 | 1/2008 |
| WO | 2009/076648 A2 | 6/2009 |
| WO | 2012100019 A1 | 7/2012 |
| WO | 2012/115717 A2 | 8/2012 |
| WO | 2014056092 A1 | 4/2014 |
| WO | 2015/000023 A1 | 1/2015 |
| WO | 2015/119509 A1 | 8/2015 |
| WO | 2015/127433 A1 | 8/2015 |
| WO | 2015176121 A1 | 11/2015 |
| WO | 2016197255 A1 | 12/2016 |
| WO | 2017/044384 A1 | 3/2017 |

OTHER PUBLICATIONS

Muller et al; Combined Multi-Coupler With Rotating Locking Method for Top Drive; U.S. Appl. No. 15/721,216, filed Sep. 29, 2017. (Application not attached to IDS.)

Amezaga et al; Tool Coupler With Threaded Connection for Top Drive; U.S. Appl. No. 15/457,572, filed Mar. 13, 2017. (Application not attached to IDS.).

Wiens; Combined Multi-Coupler With Locking Clamp Connection for Top Drive; U.S. Appl. No. 15/627,428, filed Jun. 19, 2017. (Application not attached to IDS.).

Henke et al.; Tool Coupler With Sliding Coupling Members for Top Drive; U.S. Appl. No. 15/448,297, filed Mar. 2, 2017. (Application not attached to IDS.).

Schoknecht et al.; Combined Multi-Coupler With Rotating Fixations for Top Drive; U.S. Appl. No. 15/447,926, filed Mar. 2, 2017. (Application not attached to IDS.).

Metzlaff et al.; Combined Multi-Coupler for Top Drive; U.S. Appl. No. 15/627,237, filed Jun. 19, 2017. (Application not attached to IDS.).

Liess; Combined Multi-Coupler for Top Drive; U.S. Appl. No. 15/656,914, filed Jul. 21, 2017. (Application not attached to IDS.).

Liess et al.; Combined Multi-Coupler; U.S. Appl. No. 15/656,684, filed Jul. 21, 2017. (Application not attached to IDS).

Amezaga et al.; Tool Coupler With Data and Signal Transfer Methods for Top Drive; U.S. Appl. No. 15/730,305, filed Oct. 11, 2017. (Application not attached to IDS).

Liess; Tool Coupler With Threaded Connection for Top Drive; U.S. Appl. No. 15/806,560, filed Nov. 8, 2017. (Application not attached to IDS).

EPO Partial European Search Report dated Jul. 31, 2018, for European Application No. 18159597.6.

European Patent Office; Extended Search Report for Application No. 18160808.4; dated Sep. 20, 2018; 8 total pages.

EPO Partial European Search Report dated Oct. 4, 2018, for European Patent Application No. 18159598.4.

EPO Extended European Search Report dated Oct. 5, 2018, for European Patent Application No. 18173275.1.

EPO Extended European Search Report dated Nov. 6, 2018, for European Application No. 18159597.6.

International Search Report and Written Opinion in PCT/US2018/042812 dated Oct. 17, 2018.

Extended Search Report in application EP18177312.8 dated Nov. 6, 2018.

A123 System; 14Ah Prismatic Pouch Cell; Nanophosphate® Lithium-Ion; www.a123systems.com; date unknown; 1 page.

Streicher Load/Torque Cell Systems; date unknown; 1 page.

3PS, Inc.; Enhanced Torque and Tension Sub with Integrated Turns; date unknown; 2 total pages.

Lefevre, et al.; Drilling Technology; Deeper, more deviated wells push development of smart drill stem rotary shouldered connections; dated 2008; 2 total pages.

PCT Invitaiton to Pay Additional Fees for International Application No. PCT/US2008/086699; dated Sep. 9, 2009; 7 total pages.

PCT Notification of Transmittal of the International Search Report and the Written Opinion of the International Searching Authority for International Application No. PCT/US2008/086699; dated Sep. 11, 2009; 19 total pages.

National Oilwell Varco; Rotary Shoulder Handbook; dated 2010; 116 total pages.

Weatherford; TorkSub™ Stand-Alone Torque Measuring System; dated 2011-2014; 4 total pages.

Australian Examination Report for Application No. 2008334992; dated Apr. 5, 2011; 2 total pages.

European Search Report for Application No. 08 860 261.0-2315; dated Apr. 12, 2011; 4 total pages.

Eaton; Spool Valve Hydraulic Motors; dated Sep. 2011; 16 total pages.

European Extended Search Report for Application No. 12153779.9-2315; dated Apr. 5, 2012; 4 total pages.

Australian Examination Report for Application No. 2012201644; dated May 15, 2013; 3 total pages.

Warrior; 250E Electric Top Drive (250-TON); 250H Hydraulic Top Drive (250-TON); dated Apr. 2014; 4 total pages.

(56) References Cited

OTHER PUBLICATIONS

Hydraulic Pumps & Motors; Fundamentals of Hydraulic Motors; dated Jun. 26, 2014; 6 total pages.
Warrior; Move Pipe Better; 500E Electric Top Drive (500 ton-1000 hp); dated May 2015; 4 total pages.
Canadian Office Action for Application No. 2,837,581; dated Aug. 24, 2015; 3 total pages.
European Extended Search Report for Application No. 15166062. 8-1610; dated Nov. 23, 2015; 6 total pages.
Australian Examination Report for Application No. 2014215938; dated Feb. 4, 2016; 3 total pages.
Rexroth; Bosch Group; Motors and Gearboxes; Asynchronous high-speed motors 1 MB for high speeds; dated Apr. 13, 2016; 6 total pages.
Canadian Office Action for Application No. 2,837,581; dated Apr. 25, 2016; 3 total pages.
PCT Notification of Transmittal of the International Search Report and the Written Opinion of the International Searching Authority for International Application No. PCT/US2015/061960; dated Jul. 25, 2016; 16 total pages.
PCT Notification of Transmittal of the International Search Report and the Written Opinion of the International Searching Authority for International Application No. PCT/US2016/049462; dated Nov. 22, 2016; 14 total pages.
PCT Notification of Transmittal of the International Search Report and the Written Opinion of the International Searching Authority for International Application No. PCT/US2016/050542; dated Nov. 25, 2016; 13 total pages.
PCT Notification of Transmittal of the International Search Report and the Written Opinion of the International Searching Authority for International Application No. PCT/US2016/046458; dated Dec. 14, 2016; 16 total pages.
PCT Notification of Transmittal of the International Search Report and the Written Opinion of the International Searching Authority for International Application No. PCT/US2016/047813; dated Jan. 12, 2017; 15 total pages.
PCT Notification of Transmittal of the International Search Report and the Written Opinion of the International Searching Authority for International Application No. PCT/US2016/050139; dated Feb. 20, 2017; 20 total pages.
PCT Notification of Transmittal of the International Search Report and the Written Opinion of the International Searching Authority for International Application No. PCT/US2017/014646; dated Apr. 4, 2017; 14 total pages.
PCT Notification of Transmittal of the International Search Report and the Written Opinion of the International Searching Authority for International Application No. PCT/US2017/014224; dated Jun. 8, 2017; 15 total pages.
European Extended Search Report for Application No. 17152458. 0-1609; dated Jun. 8, 2017; 7 total pages.
Australian Examination Report for Application No. 2017200371; dated Sep. 19, 2017; 5 total pages.
European Extended Search Report for Application No. 17195552. 9-1614; dated Dec. 4, 2017; 6 total pages.
Australian Examination Report for Application No. 2017200371; dated Feb. 8, 2018; 6 total pages.
Canadian Office Action for Application No. 2,955,754; dated Mar. 28, 2018; 3 total pages.
Australian Examination Report for Application No. 2017200371; dated May 2, 2018; 4 total pages.
Canadian Office Action for Application No. 2,974,298; dated May 16, 2018; 3 total pages.
European Patent Office; Extended European Search Report for Application No. 18157915.2; dated Jun. 6, 2018; 8 total pages.
Canadian Office Action in related application CA 2,955,754 dated Jul. 17, 2018.
EPO Extended European Search Report dated Jul. 19, 2018, for European Application No. 18159595.0.
EPO Extended European Search Report dated Jul. 17, 2018, for European Application No. 18158050.7.
Cookson, Colter, "Inventions Speed Drilling, Cut Costs," The American Oil & Gas Reporter, Sep. 2015, 2 pages.
Ennaifer, Amine et al., "Step Change in Well Testing Operations," Oilfield Review, Autumn 2014: 26, No. 3, pp. 32-41.
Balltec Lifting Solutions, LiftLOK™ Brochure, "Highest integrity lifting tools for the harshest environments," 2 pages.
Balltec Lifting Solutions, CoiILOK™ Brochure, "Highest integrity hand-held coiled tubing handling tools," 2 pages.
Peters; Tool Coupler for Use With a Top Drive; U.S. Appl. No. 15/656,508, filed Jul. 21, 2017. (Application not attached to IDS.).
Fuehring et al.; Tool Coupler With Rotating Coupling Method for Top Drive; U.S. Appl. No. 15/445,758, filed Feb. 28, 2017. (Application not attached to IDS.).
Bell; Interchangeable Swivel Combined Multicoupler; U.S. Appl. No. 15/607,159, filed May 26, 2017 (Application not attached to IDS.).
Amezaga; Dual Torque Transfer for Top Drive System; U.S. Appl. No. 15/447,881, filed Mar. 2, 2017. (Application not attached to IDS.).
Zouhair; Coupler With Threaded Connection for Pipe Handler; U.S. Appl. No. 15/444,016, filed Feb. 27, 2017. (Application not attached to IDS.).
Liess; Downhole Tool Coupling System; U.S. Appl. No. 15/670,897, filed Aug. 7, 2017. (Application not attached to IDS.).
Extended European Search Report in related application 18161224.3 dated Oct. 19, 2018.
EPO Office Action dated Sep. 19, 2019, for European Application No. 18161224.3.

\* cited by examiner

TOOL COUPLER WITH THREADED CONNECTION FOR TOP DRIVE

CROSS-REFERENCE TO RELATED APPLICATIONS

This application is a divisional application of U.S. patent application Ser. No. 15/457,572, filed Mar. 13, 2017, which is incorporated by reference.

BACKGROUND OF THE INVENTION

Embodiments of the present invention generally relate to equipment and methods for coupling a top drive to one or more tools. The coupling may transfer both axial load and torque bi-directionally from the top drive to the one or more tools.

A wellbore is formed to access hydrocarbon-bearing formations (e.g., crude oil and/or natural gas) or for geothermal power generation by the use of drilling. Drilling is accomplished by utilizing a drill bit that is mounted on the end of a tool string. To drill within the wellbore to a predetermined depth, the tool string is often rotated by a top drive on a drilling rig. After drilling to a predetermined depth, the tool string and drill bit are removed, and a string of casing is lowered into the wellbore. Well construction and completion operations may then be conducted.

During drilling and well construction/completion, various tools are used which have to be attached to the top drive. The process of changing tools is very time consuming and dangerous, requiring personnel to work at heights. The attachments between the tools and the top drive typically include mechanical, electrical, optical, hydraulic, and/or pneumatic connections, conveying torque, load, data, signals, and/or power.

Typically, sections of a tool string are connected together with threaded connections. Such threaded connections are capable of transferring load. Right-hand (RH) threaded connections are also capable of transferring RH torque. However, application of left-hand (LH) torque to a tool string with RH threaded connections (and vice versa) risks breaking the string. Methods have been employed to obtain bi-directional torque holding capabilities for connections. Some examples of these bi-directional setting devices include thread locking mechanisms for saver subs, hydraulic locking rings, set screws, jam nuts, lock washers, keys, cross/thru-bolting, lock wires, clutches and thread locking compounds. However, these solutions have shortcomings. For example, many of the methods used to obtain bi-directional torque capabilities are limited by friction between component surfaces or compounds that typically result in a relative low torque resistant connection. Locking rings may provide only limited torque resistance, and it may be difficult to fully monitor any problem due to limited accessibility and location. For applications that require high bi-directional torque capabilities, only positive locking methods such as keys, clutches or cross/through-bolting are typically effective. Further, some high bi-directional torque connections require both turning and milling operations to manufacture, which increase the cost of the connection over just a turning operation required to manufacture a simple male-to-female threaded connection. Some high bi-directional torque connections also require significant additional components as compared to a simple male-to-female threaded connection, which adds to the cost.

Safer, faster, more reliable, and more efficient connections that are capable of conveying load, data, signals, power and/or bi-directional torque between the tool string and the top drive are needed.

SUMMARY OF THE INVENTION

The present invention generally relates to equipment and methods for coupling a top drive to one or more tools. The coupling may transfer both axial load and torque bi-directionally from the top drive to the one or more tools.

In an embodiment, a drive unit of a top drive system includes a drive stem having a torque gear profile and a load coupling, wherein the load coupling is a threaded coupling; and a torque sleeve movable between a first position and a second position, and having a sleeve gear profile that engages the torque gear profile when the torque sleeve is in the second position.

In an embodiment, a method of coupling a drive unit to a tool adapter includes positioning the tool adapter below the drive unit; rotating a drive stem of the drive unit to make up a threaded coupling with a tool stem of the tool adapter; and moving a torque sleeve of the drive unit to engage both a torque gear profile of the drive stem and a stem gear profile of the tool stem.

In an embodiment, a drive unit of a top drive system includes a drive stem having a load coupling that is a threaded coupling; a spindle unit comprising: an interior through which the drive stem extends; a counter nut having a first guide profile mated with a second guide profile on the drive stem; and a spindle having threading mated with threading on the counter nut; and an annular motor operationally coupled to the spindle unit.

In an embodiment, a method of coupling a drive unit to a tool adapter includes positioning the tool adapter below the drive unit; rotating a drive stem of the drive unit to make up a threaded coupling with a tool stem of the tool adapter; and rotating a spindle unit relative to the drive stem to contact a counter nut of the spindle unit with the tool stem.

In an embodiment, a drive unit of a top drive system includes a drive stem having first friction surfaces and a load coupling, wherein the load coupling is a threaded coupling; a transmission unit having: second friction surfaces parallel to the first friction surfaces; and shoulders proximate a bottom of the transmission unit; and a transmission selector movable to an "on" position or an "off" position, wherein the drive stem moves synchronously with the transmission unit when the transmission selector is in the "on" position.

In an embodiment, a method of coupling a drive unit to a tool adapter includes positioning the tool adapter below the drive unit so that shoulders of a transmission unit of the drive unit align with shoulders of a tool stem of the tool adapter; and rotating a drive stem of the drive unit to make up a threaded coupling with the tool stem, wherein: the drive stem and the transmission unit rotate together during the positioning of the tool adapter; and the drive stem and the transmission unit do not rotate together during the making up of the threaded coupling.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention provides equipment and methods for coupling a top drive to one or more tools. The coupling may transfer torque bi-directionally from the top drive to the one or more tools. The coupling may provide mechanical, electrical, optical, hydraulic, and/or pneumatic connections. The coupling may conveying torque, load, data, signals, and/or power. For example, axial loads of tool strings may be expected to be several hundred tons, up to, including, and sometimes surpassing 750 tons. Required torque transmission may be tens of thousands of foot-pounds, up to, including, and sometimes surpassing 100 thousand foot-pounds. Embodiments disclosed herein may provide axial connection integrity, capable of supporting high axial loads, good sealability, resistance to bending, high flow rates, and high flow pressures.

Some of the many benefits provided by embodiments of this disclosure include a reliable method to transfer full bi-directional torque, thereby reducing the risk of accidental breakout of threaded connections along the tool string. Embodiments of this disclosure also provide a fast, hands-free method to connect and transfer power from the drive unit to the tool adapter. Embodiments provide automatic connection for power and data communications.

In some embodiments, the torque transfer path from the top drive system to the tool string bypasses the threaded connection between the drive unit and the tool adapter. This may allow full bi-directional torque to be applied in the tool string. This compares to systems wherein the torque transfer path proceeds through the threaded connections between the drive unit and the tool adapter which present a risk of backing out the main threaded connection while rotating in the breakout direction.

Figure 1:
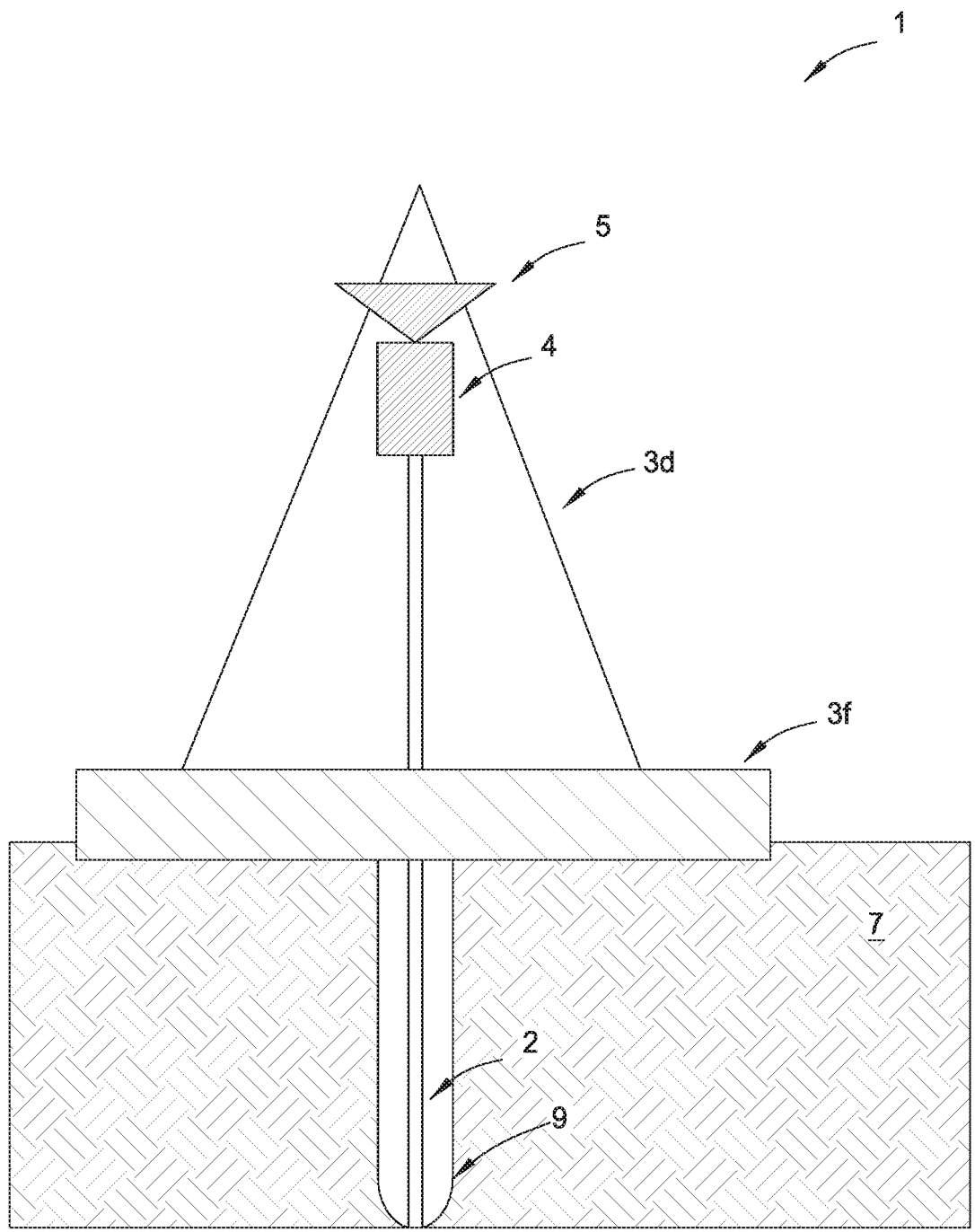
FIG. 1 illustrates a drilling system, according to embodiments of the present disclosure.

FIG. 1 illustrates a drilling system 1, according to embodiments of the present disclosure. The drilling system 1 may include a drilling rig derrick 3d on a drilling rig floor 3f. As illustrated, drilling rig floor 3f is at the surface of a subsurface formation 7, but the drilling system 1 may also be an offshore drilling unit, having a platform or subsea wellhead in place of or in addition to rig floor 3f. The derrick may support a hoist 5, thereby supporting a top drive 4. In some embodiments, the hoist 5 may be connected to the top drive 4 by threaded couplings. The top drive 4 may be connected to a tool string 2. At various times, top drive 4 may support the axial load of tool string 2. In some embodiments, the top drive 4 may be connected to the tool string 2 by threaded couplings. The rig floor 3f may have an opening through which the tool string 2 extends downwardly into a wellbore 9. At various times, rig floor 3f may support the axial load of tool string 2. During operation, top drive 4 may provide torque to tool string 2, for example to operate a drilling bit near the bottom of the wellbore 9. The tool string 2 may include joints of drill pipe connected together, such as by threaded couplings. At various times, top drive 4 may provide right hand (RH) torque or left hand (LH) torque to tool string 2, for example to make up or break out joints of drill pipe. Power and/or signals may be communicated between top drive 4 and tool string 2. For example, pneumatic, hydraulic, electrical, optical, or other power and/or signals may be communicated between top drive 4 and tool string 2. The top drive 4 may include a control unit, a drive unit, and a tool adapter. In some embodiments, the tool adapter may utilize threaded connections. In some embodiments, the tool adapter may be a combined multi-coupler (CMC) or quick connector to support load and transfer torque with couplings to transfer power (hydraulic, electric, data, and/or pneumatic).

Figure 2:
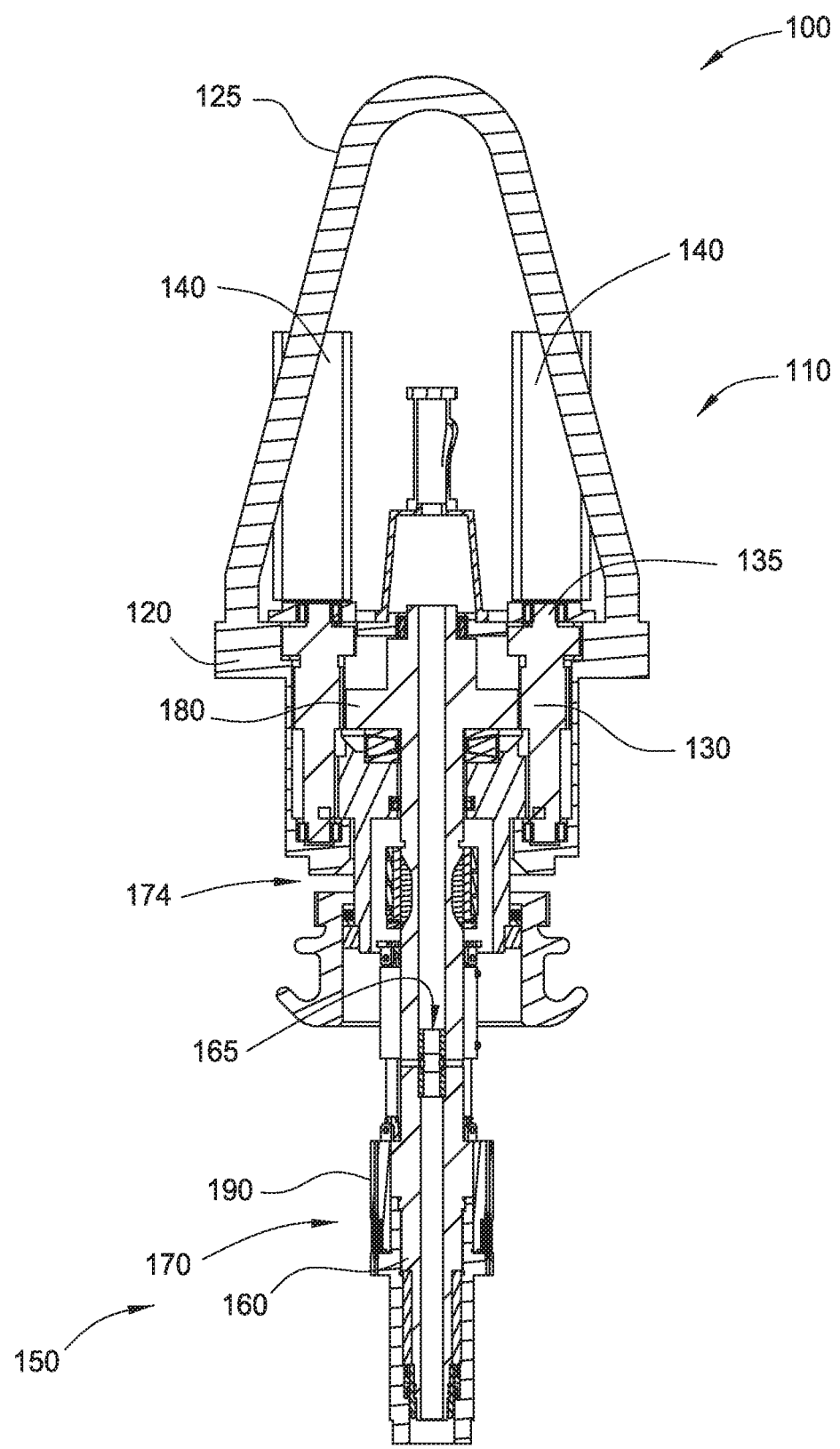
FIG. 2 illustrates a top drive system of the drilling system of FIG. 1.

FIG. 2 illustrates a top drive system 100 (e.g., top drive 4 in FIG. 1) according to embodiments described herein. Generally, top drive system 100 includes a drive unit 110 and a tool adapter 150. The drive unit 110 generally includes a housing 120, becket 125, drive gears 130, motors 140 (e.g., electric or hydraulic motors), first portions of one or more couplings 170, a drive stem 180, and a torque sleeve 190. Becket 125 may convey load from the top drive system 100 to the hoist 5. Becket 125 may be used with, or replaced by, other load-transfer components. Drive gears 130 may couple to motors 140 by way of shaft 135. Drive gears 130 may convey torque between the motors 140 and the drive stem 180. As illustrated, top drive system 100 includes two drive gears 130 (only one shown in FIG. 2) and two motors 140. Any number of drive gears 130 and/or motors 140 may be considered to accommodate manufacturing and operational conditions. The motors 140 may be fixed relative to the housing 120. The drive stem 180 may extend through an interior of torque sleeve 190. The tool adapter 150 generally includes a tool stem 160 and second portions of the couplings 170. Couplings 170 may include complementary components disposed in or on drive unit 110 and tool adapter 150. The tool stem 160 generally remains below the drive unit 110. (It should be understood that "below", "above", "vertically", "up", "down", and similar terms as used herein refer to the general orientation of top drive 4 as illustrated in FIG. 1. In some instances, the orientation may vary somewhat, in response to various operational conditions. In any instance wherein the central axis of the top drive system is not aligned precisely with the direction of gravitational force, "below", "above", "vertically", "up", "down", and similar terms should be understood to be along the central axis of the top drive system.) The tool stem 160 connects the top drive system 100 to the tool string 2. The tool stem 160 and drive stem 180 may share a central bore 165 (e.g. providing fluid communication through the top drive system 100 to the tool string 2). Couplings 170 may include, for example, threaded couplings, hydraulic couplings, pneumatic couplings, electronic couplings, fiber optic couplings, power couplings, data couplings, and/or signal couplings. When the drive unit 110 is coupled to the tool adapter 150, top drive system 100 may transfer bi-directional torque, load, power, data, and/or signals between the top drive and the tool.

Figures 3A, 3B:
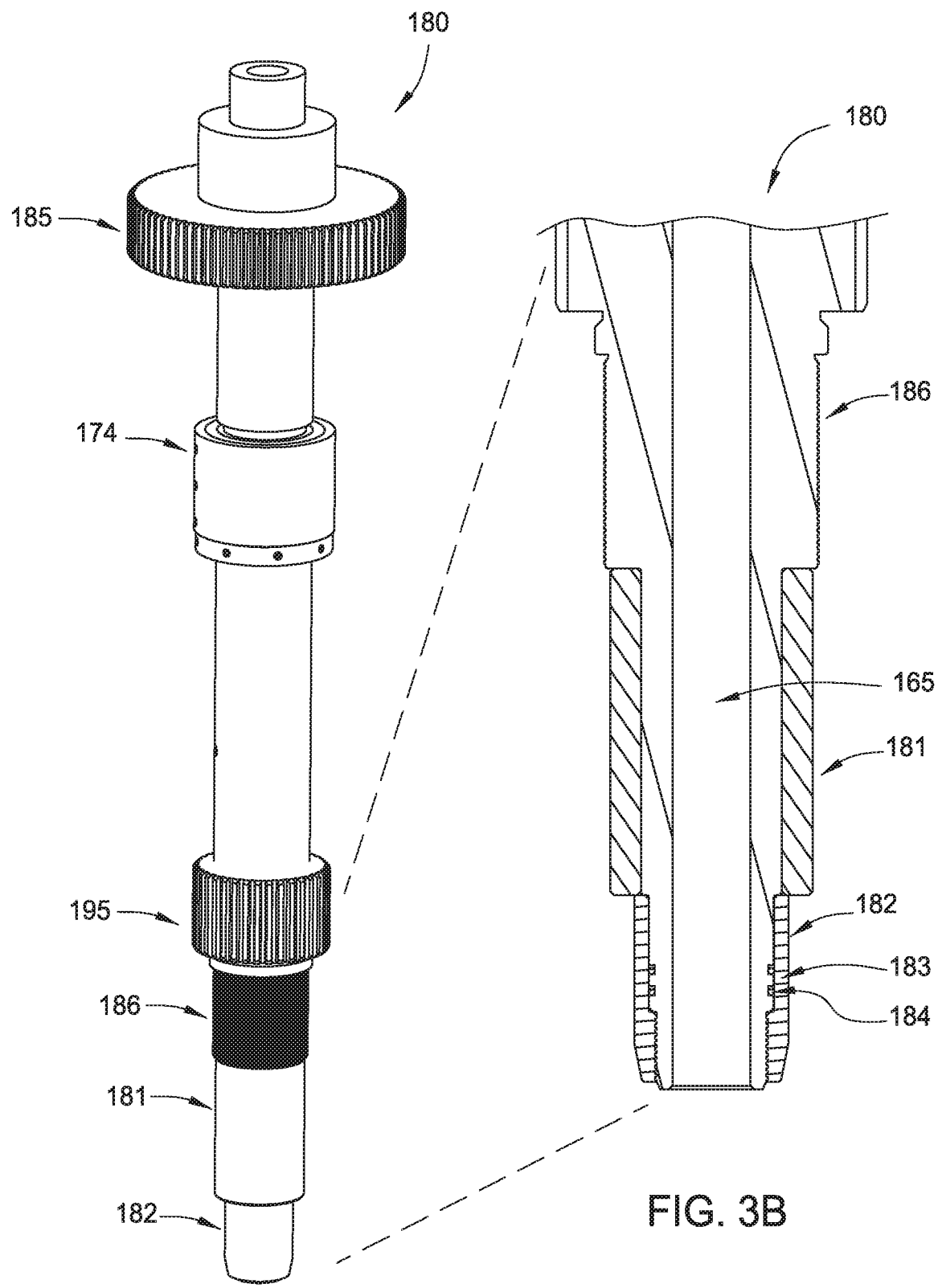
FIGS. 3A-3B illustrates a drive stem of the top drive system of FIG. 2.

As illustrated in FIG. 3, drive stem 180 may have two gear profiles: drive gear profile 185 and torque gear profile 195. Drive gears 130 (FIG. 2) may engage drive stem 180 at drive gear profile 185. Motors 140 may turn shaft 135, which turns drive gears 130, thereby turning drive gear profile 185 and drive stem 180. Drive gear profile 185 may have teeth designed to mesh with the gearing of drive gears 130. Alternatively, drive gears 130 and/or drive gear profile 185 may be configured to engage belt drive, chain drive, or other systems that are capable of conveying rotation. Also illustrated in FIG. 3, the drive stem 180 may be encircled by swivel 174, centering ring 181, and/or seal sleeve 182. The centering ring 181 may provide rigidity to the connection, for example, resisting bending forces. The centering ring 181 may assist in alignment of seals, couplers, and/or data connectors. For example, the centering ring 181 may provide for proper alignment between the drive stem 180 and the seal package 163 (FIG. 5B) of the tool stem 160. The fit between the centering ring 181 and the tool stem 160 may control or reduce play between the components, thereby improving the sealing performance. The coupling between drive stem 180 and seal sleeve 182 may include a threaded coupling 183 and/or one or more O-rings 184. The O-rings 184 may engage the inner diameter of the seal sleeve 182 to reduce or prevent high pressure fluid leakage out of the connection. The seal sleeve 182 may be incorporated as a replaceable component of the drive unit 110. Also illustrated in FIG. 3, a portion of the exterior of drive stem 180 may include a threaded coupling 186. As illustrated, threaded coupling 186 is disposed between centering ring 181 and torque gear profile 195, but threaded coupling 186 may also be disposed at other locations along the length of drive stem 180. When the drive unit 110 is coupled to the tool adapter 150, threaded coupling 186 may provide a load coupling between drive stem 180 and tool stem 160. Threaded coupling 186 may be a heavy-load capacity thread (e.g., stub acme thread).

Figure 4A:
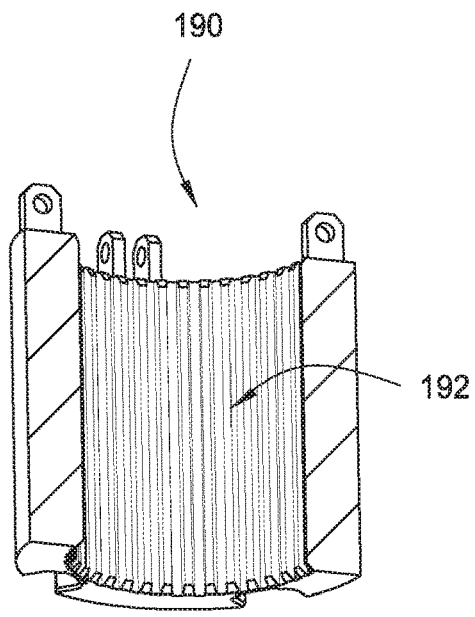
FIGS. 4A-4B illustrates a torque sleeve of the top drive system of FIG. 2.

As illustrated in FIG. 4A, at least a portion of the interior of torque sleeve 190 may include a sleeve gear profile 192. Sleeve gear profile 192 may engage torque gear profile 195 when torque sleeve 190 is in a lowered position (shown in FIG. 6C). When torque sleeve 190 is in a lowered position, drive stem 180 may turn torque gear profile 195, which engages sleeve gear profile 192, thereby turning torque sleeve 190.

Figure 5A:
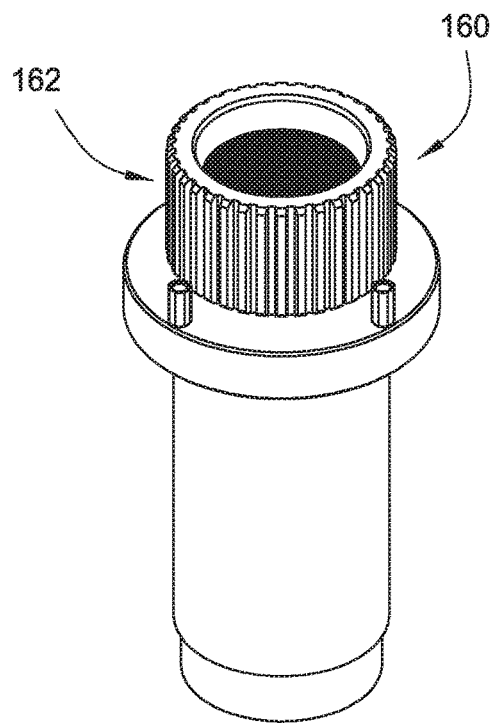
FIGS. 5A-5B illustrates a tool stem of the top drive system of FIG. 2.
Figure 5B:
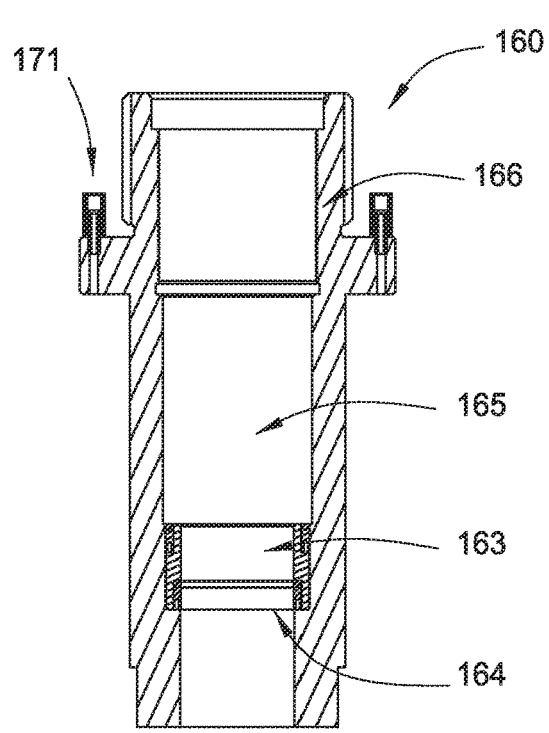

As illustrated in FIG. 5A, tool stem 160 may have a stem gear profile 162 on at least a portion of an exterior surface near the top of the tool stem 160. Sleeve gear profile 192 may engage stem gear profile 162 when torque sleeve 190 is in a lowered position (shown in FIG. 6C). When torque sleeve 190 is in a lowered position, drive stem 180 may turn torque gear profile 195, which engages sleeve gear profile 192, which engages stem gear profile 162, thereby turning tool stem 160. As illustrated in FIG. 5B, tool stem 160 may have a seal package 163 disposed in the central bore 165. When the drive unit 110 is coupled to the tool adapter 150, the seal package 163 may provide a seal of the central bore 165 between the drive stem 180 and the tool stem 160. The seal package 163 may be located adjacent to a shoulder 164 or in a recess (not shown) of the interior of tool stem 160. The seal package may include high pressure-high temperature (HPHT) dynamic seals. For example, the seal package may seal the central bore 165 up to pressures of about 15 k psi. Also illustrated in FIG. 5B, tool stem 160 may have a threaded coupling on at least a portion of an interior surface near the top of the tool stem 160.

Figure 6A:
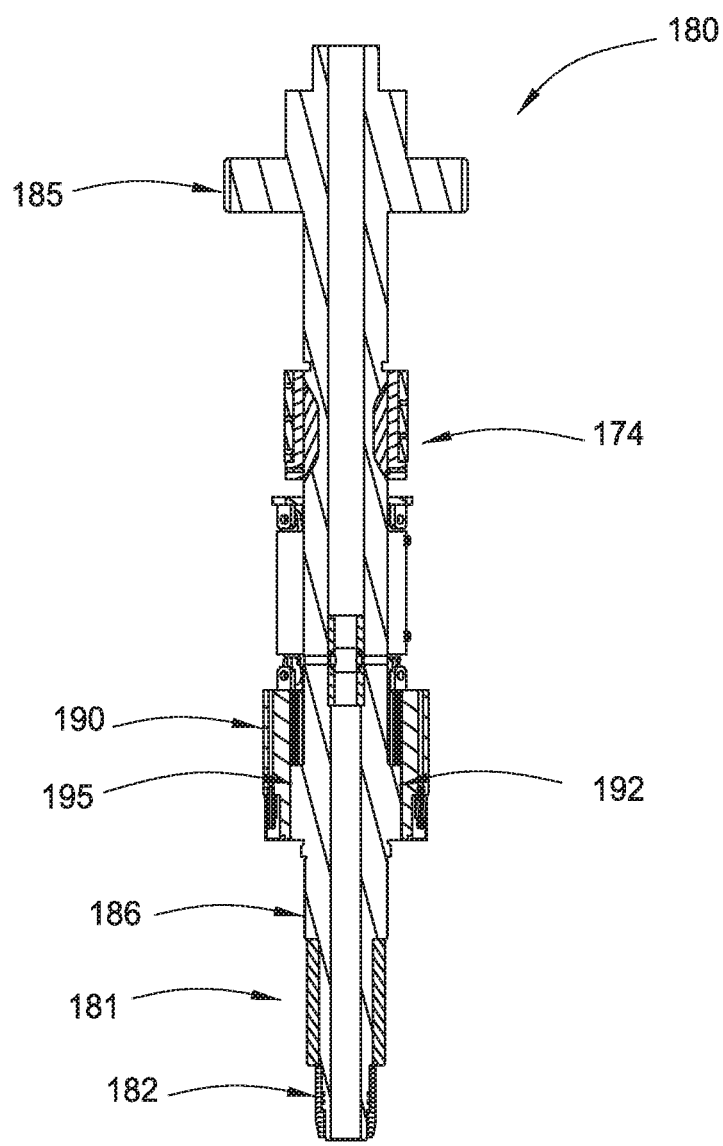
FIGS. 6A-6C illustrate coupling between a drive unit and a tool adapter of the top drive system of FIG. 2.
Figure 6B:
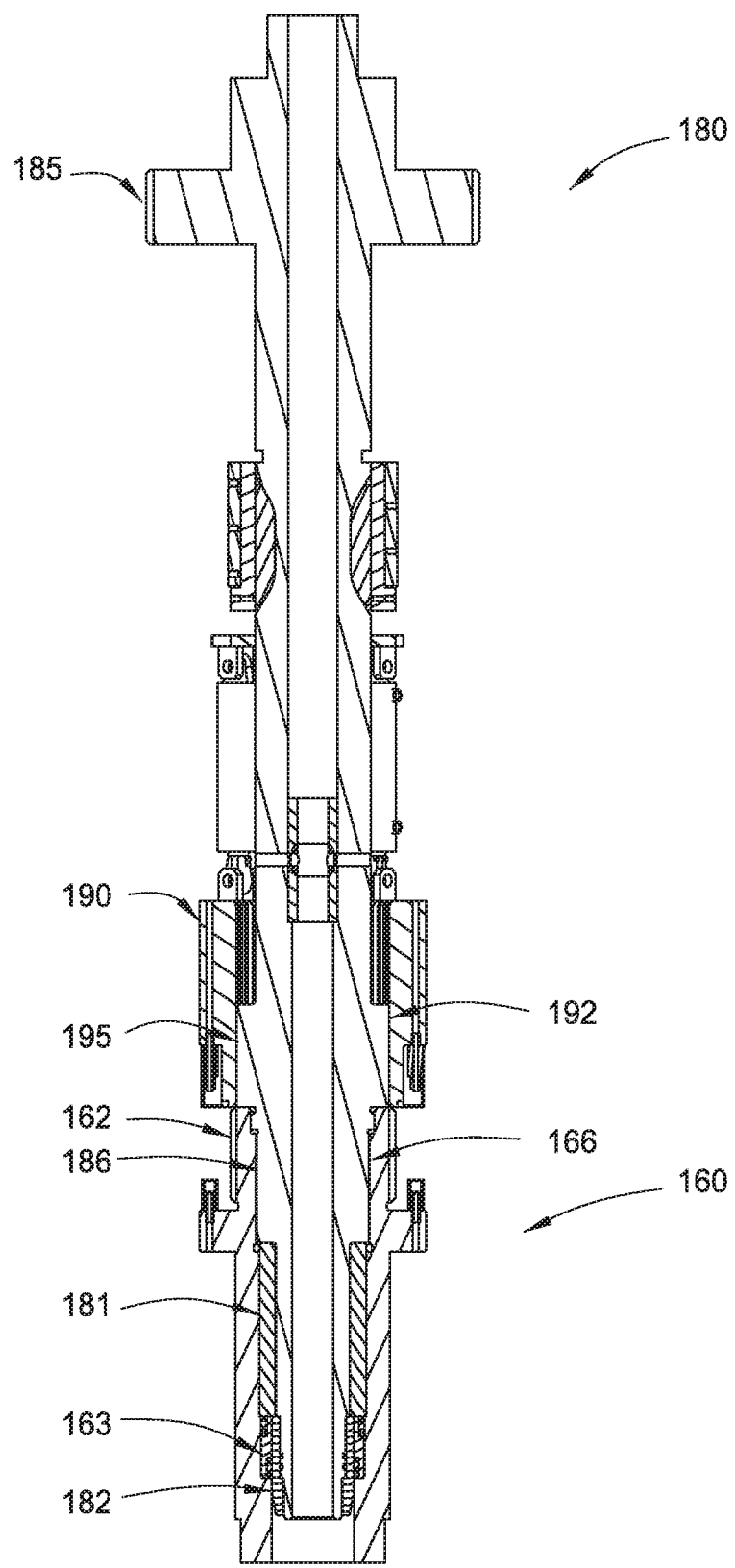

Drive unit 110 may be coupled to tool adapter 150 in order to transfer bi-directional torque, load, power, data, and/or signals between the top drive and the tool. Coupling of drive unit 110 to tool adapter 150 may proceed as a multi-step process. In one embodiment, as illustrated in FIGS. 6A-6B, the coupling begins with axial load coupling between drive stem 180 and tool stem 160. Drive stem 180 may be aligned with tool stem 160 so that a lower portion of drive stem 180 may be stabbed into tool stem 160. For example, drive stem 180 may be lowered relative to tool stem 160, and/or tool stem 160 may be raised relative to drive stem 180. Drive stem 180 may rotate relative to tool stem 160 so that threaded coupling 186 on drive stem 180 engage and mate with threaded coupling 166 on tool stem 160 (FIG. 6B). Threaded coupling 166 may be a heavy-load capacity thread (e.g., stub acme thread). An exterior surface of seal sleeve 182 may contact and/or engage with seal package 163.

Motors 140 may provide torque to make up or break out the axial load connection between tool stem 160 and drive stem 180. For example, motors 140 may turn shaft 135, which turns drive gears 130, thereby turning drive gear profile 185 and drive stem 180. Threaded coupling 186 on drive stem 180 may engage and mate with threaded coupling 166 on tool stem 160. Torque of drive stem 180 may cause threading (or unthreading, depending on direction) between tool stem 160 and drive stem 180. The drive stem 180 may have RH male threading, while the tool stem 160 may have RH female threading. When tool stem 160 is coupled to drive stem 180, as shown in FIG. 6B, axial load may be transferred between the top drive and the tool. Likewise, when tool stem 160 is coupled to drive stem 180, central bore 165 may provide fluid communication between the top drive and the tool. It should be appreciated that, when tool stem 160 is coupled to drive stem 180, torque in the direction of the threaded couplings 186/166 may also be transferred between the top drive and the tool. For example, torque may be transferred from the motors 140 through shaft 135 to the drive gears 130, through drive gear profiles 185 to the drive stem 180, through the threaded couplings 186/166, to the tool stem 160, and to the tool string 2.

Figure 6C:
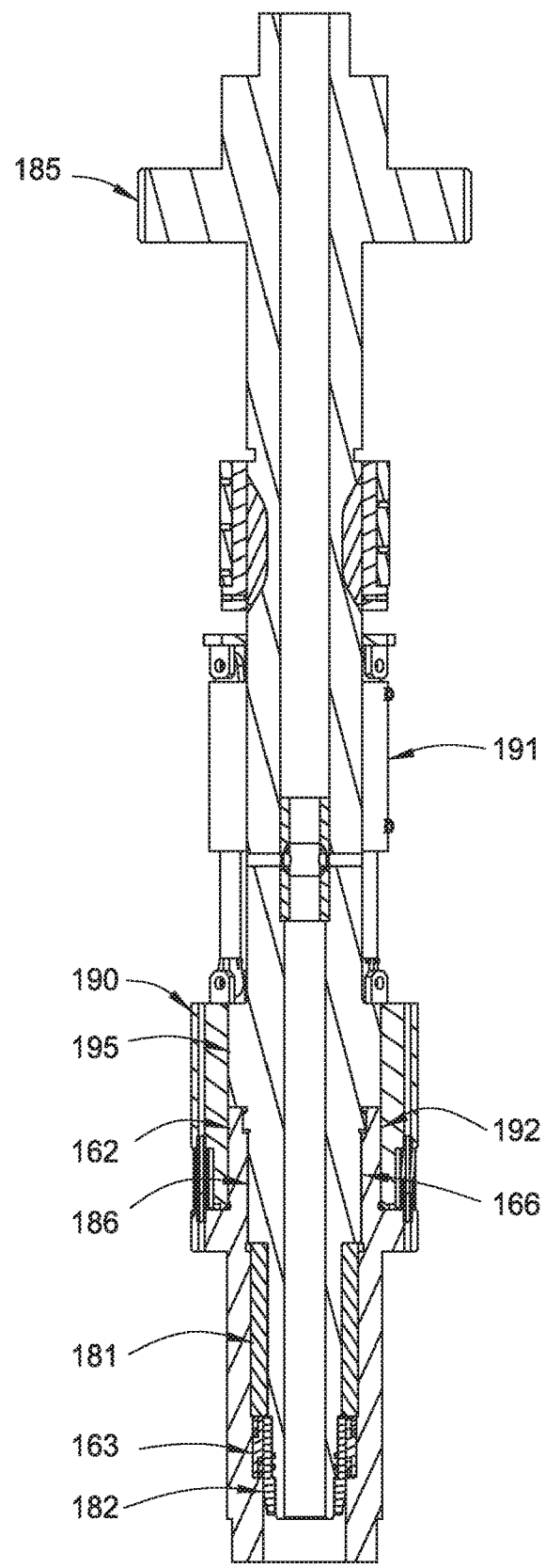

Coupling of drive unit 110 to tool adapter 150 may proceed with bi-directional torque coupling between torque sleeve 190 and tool stem 160, as illustrated in FIGS. 6B-6C. The drive stem 180 may extend through an interior of torque sleeve 190. Torque sleeve 190 may move vertically relative to drive stem 180. For example, actuators 191 (e.g., hydraulic or pneumatic cylinders, or electric actuators) on drive stem 180 may move torque sleeve 190 between a raised position and a lowered position. While tool stem 160 is load coupling with drive stem 180, as shown in FIGS. 6A-6B, torque sleeve 190 may be in the raised position (relative to drive stem 180). Torque sleeve 190 may then move to the lowered position (relative to drive stem 180; FIG. 6C) to engage tool stem 160, thereby transferring torque. For example, sleeve gear profile 192 on an interior surface of torque sleeve 190 may engage torque gear profile 195 of drive stem 180 when torque sleeve 190 is in the lowered position (shown in FIG. 6C). Drive stem 180 may turn torque gear profile 195 to engage sleeve gear profile 192, thereby turning torque sleeve 190, and sleeve gear profile 192 may also engage stem gear profile 162, thereby turning tool stem 160.

Once torque sleeve 190 has moved to a lowered position and coupled to tool stem 160, as shown in FIG. 6C, bi-directional torque may be transferred between the top drive and the tool. For example, torque gear profile 195 of drive stem 180 may engage sleeve gear profile 192 of torque sleeve 190, which, when in the lowered position, also engages stem gear profile 162, thereby providing torque to tool stem 160 during drilling operations. Bi-directional torque may be thereby transferred from the motors 140 of the drive unit 110 to the tool stem 160, and thus to the tool string 2.

Figure 4B:
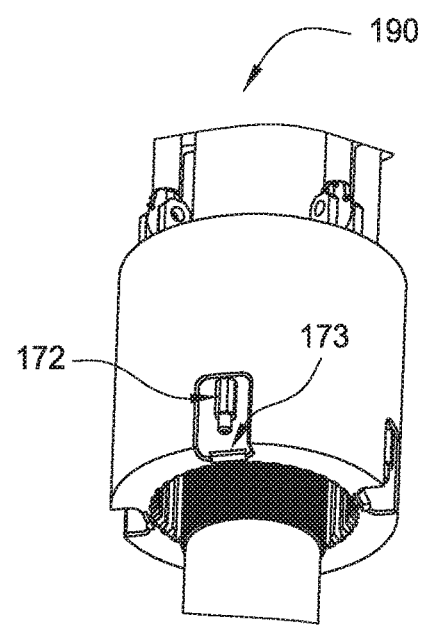

In some embodiments, coupling drive unit 110 to tool adapter 150 may be facilitated with various sensors, actuators, couplers, and/or adapters. For example, couplings 170 may include one or more hydraulic, pneumatic, electrical, or optical couplings, providing fluid, electrical, optical, signal, data, and/or power communication between the drive unit 110 and the tool adapter 150. Couplings 170 may include tool stem connectors 171 (FIG. 5B) and mating torque sleeve connectors 172 (FIG. 4B). connectors 171/172 may communicate signals (e.g., hydraulic, pressure, fluid, data, optical, electrical, etc.) from the drive unit 110 to the tool adapter 150. Alternatively, connectors 172 may be incorporated on drive stem 180.

As another example, couplings 170 may include a swivel 174 (e.g., a hydraulic swivel or a pneumatic swivel) along drive stem 180. Swivel 174 may be disposed co-axially with drive stem 180. Swivel 174 may encircle drive stem 180. In some embodiments, swivel 174 may be fixed relative to housing 120 while allowing rotation between swivel 174 and drive stem 180. In some embodiments, swivel 174 may be fixed relative to drive stem 180 while allowing rotation between swivel 174 and housing 120. In some embodiments, swivel 174 may be free to rotate both relative to drive stem 180 and housing 120.

As another example, coupling drive unit 110 to tool adapter 150 may be facilitated with various sensors. The torque sleeve 190 may have sensors 173 (FIG. 4B) located near its lower edge to ease the alignment process between the couplings 170 located on the drive unit 110 and mating couplings 170 located on the tool adapter 150.

Figure 7:
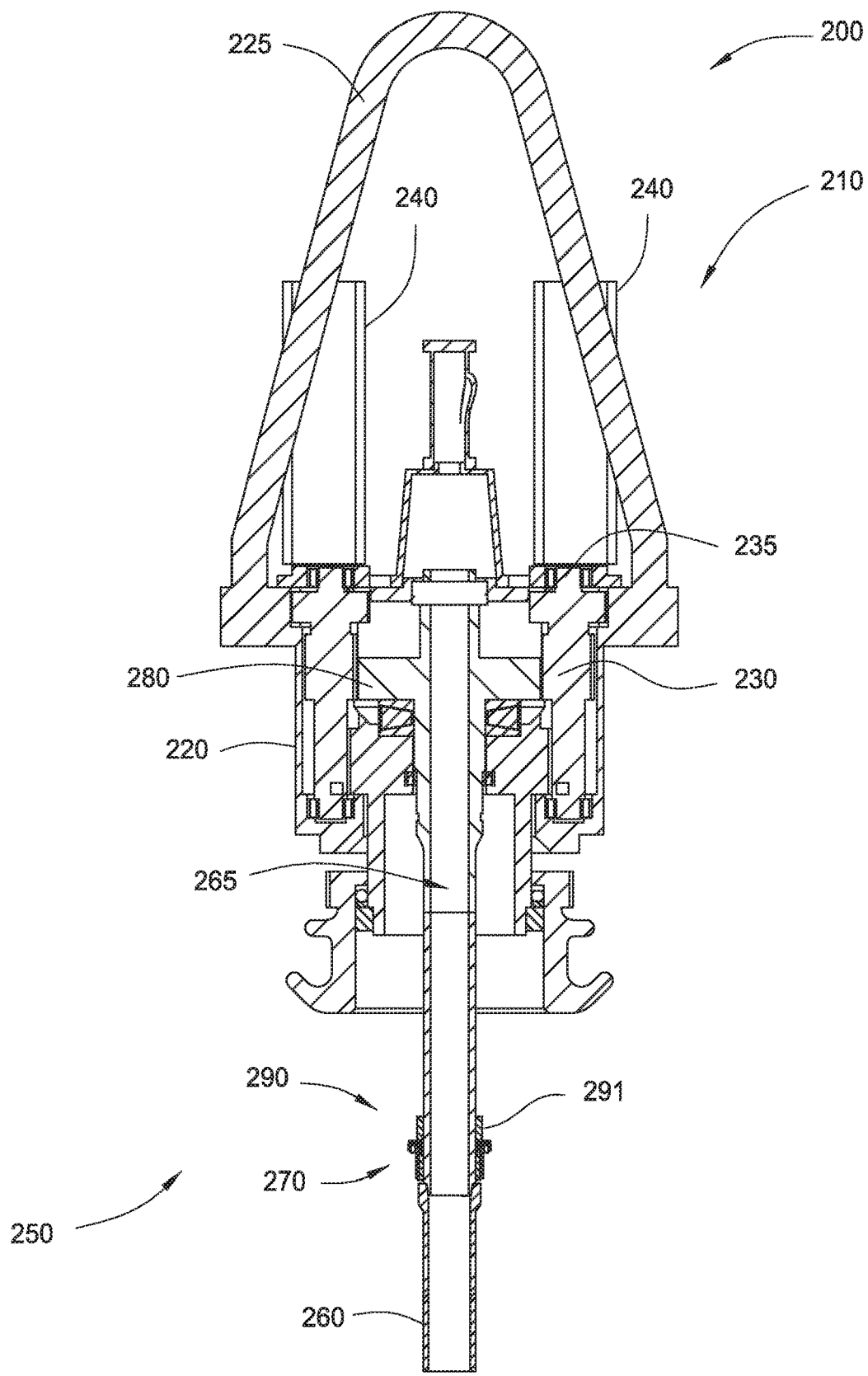
FIG. 7 illustrates a top drive system of the drilling system of FIG. 1.

FIG. 7 illustrates an alternative top drive system 200 according to embodiments described herein. Except as noted, top drive system 200 is configured and functions similarly to top drive system 100. For example, top drive system 200 includes a drive unit 210 and a tool adapter 250. The drive unit 210 generally includes a housing 220, becket 225, drive gears 230, motors 240, first portions of one or more couplings 270, and a drive stem 280. Rather than torque sleeve 190, drive unit 210 includes a spindle unit 290. Rather than actuators 191, drive unit 210 includes an annular motor 291 (e.g., hydraulic or electric motor) operationally coupled to components of the spindle unit 290. The drive stem 280 may extend through an interior of spindle unit 290. In some embodiments, at least a portion of the annular motor 291 may be fixed relative to the drive stem 280. The tool adapter 250 generally includes a tool stem 260 and second portions of the couplings 270. The tool stem 260 connects the top drive system 200 to the tool string 2. The tool stem 260 and drive stem 280 may share a central bore 265. When the drive unit 210 is coupled to the tool adapter 250, top drive system 200 may transfer bi-directional torque, load, power, data, and/or signals between the top drive and the tool.

Figure 8A:
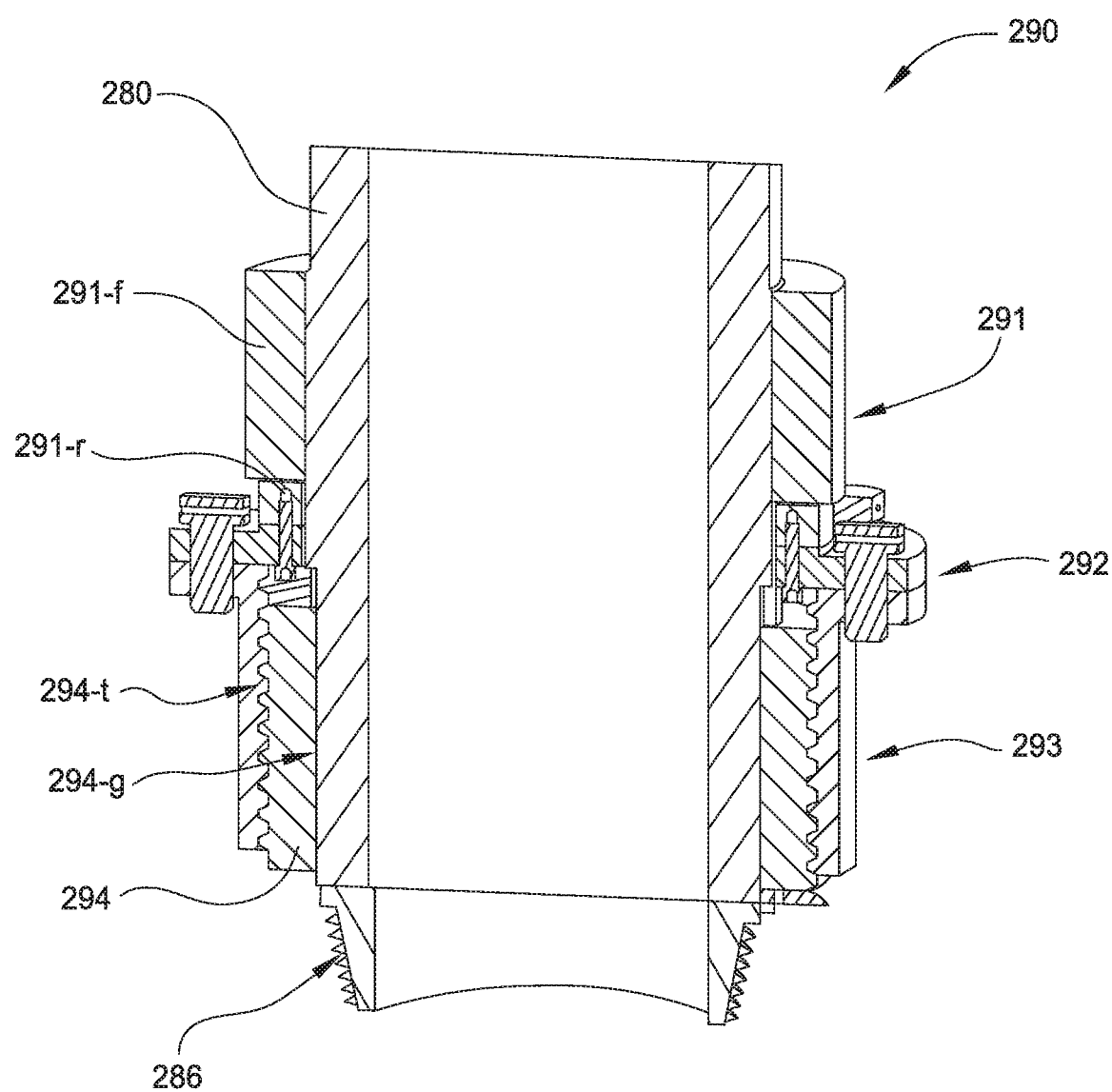
FIGS. 8A-8B illustrates a spindle unit of the top drive system of FIG. 7.
Figure 8B:
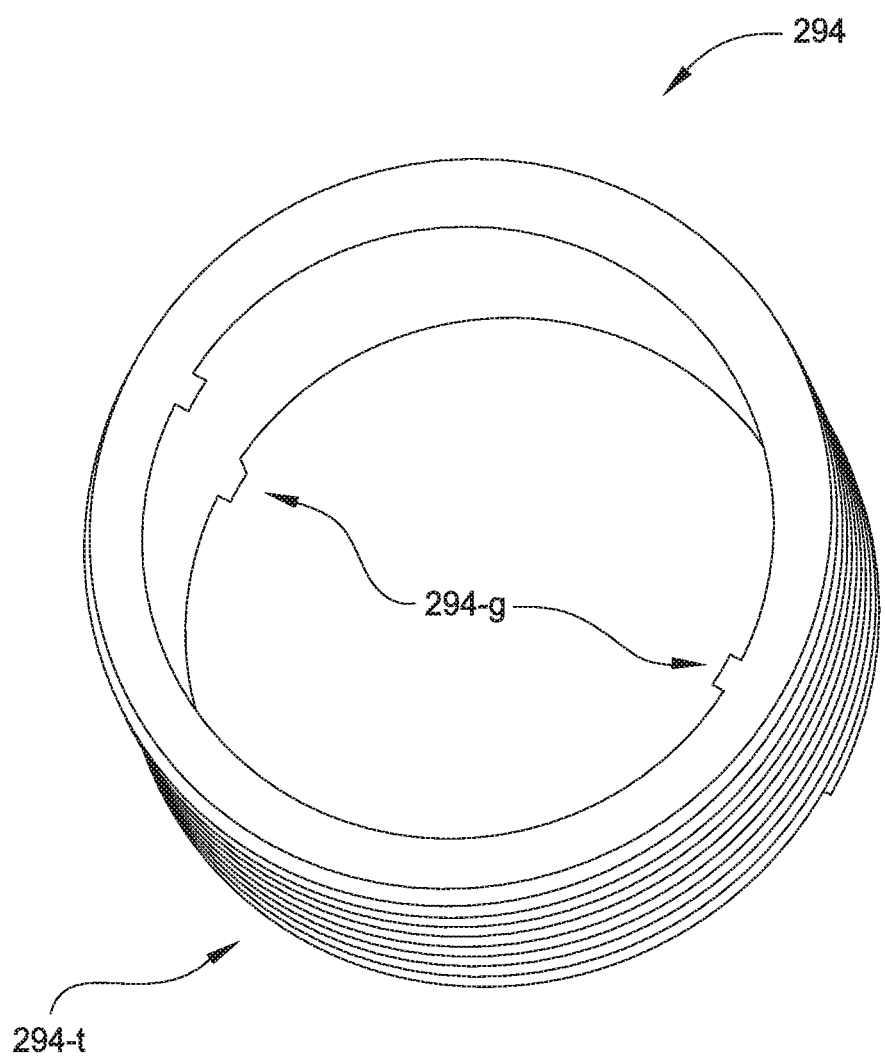

As illustrated in FIG. 8A, spindle unit 290 generally includes annular motor 291, a spindle 293, and a counter nut 294. The drive stem 280 may extend through interiors of annular motor 291, spindle 293, and/or counter nut 294. Annular motor 291 is configured to rotate spindle 293 relative to drive stem 280. In some embodiments, a portion of annular motor 291 is fixed to drive stem 280. In some embodiments, a portion of annular motor 291 is rotationally coupled to spindle 293. An example of a suitable annular motor is a 1 MB frameless, maintenance-free asynchronous motor with high power density, available from Bosch Rexroth AG of Lohr, Germany. In the illustrated embodiment, annular motor 291 includes a fixed portion 291-$f$ that is fixed to drive stem 280, and a rotatable portion 291-$r$ that is rotatable relative to drive stem 280. As illustrated, rotatable portion 291-$r$ is rotationally coupled to spindle 293. For example, rotatable portion 291-$r$ is coupled to a flange 292, which is coupled to spindle 293. In some embodiments, flange 292 and spindle 293 are permanently fixed together and/or formed as a unified component. Annular motor 291 may thereby drive rotation in spindle 293 by rotating rotatable portion 291-$r$ relative to fixed portion 291-$f$. In other embodiments, annular motor 291 includes gearing, wheels, tracks, etc., capable of conveying rotational motion (relative to drive stem 280) to spindle 293. Counter nut 294 may move vertically relative to drive stem 280 and/or spindle 293. Annular motor 291 may provide torque, thereby rotating spindle 293 relative to drive stem 280. Spindle 293 may have internal threading, and counter nut 294 may have external threading, for example threading 294-$t$ (FIG. 8B). Spindle 293 may thereby mate with and/or engage counter nut 294. Drive stem 280 may have an external guide profile proximate the spindle unit 290, and counter nut 294 may have an internal guide profile, for example guide profile 294-$g$ (FIG. 8B). Counter nut 294 may thereby mate with and/or engage drive stem 280. Engagement of the guide profiles may prevent rotation between counter nut 294 and drive stem 280. Also illustrated in FIG. 8A, a portion of the exterior of drive stem 280 may include a threaded coupling 286.

Figure 9A:
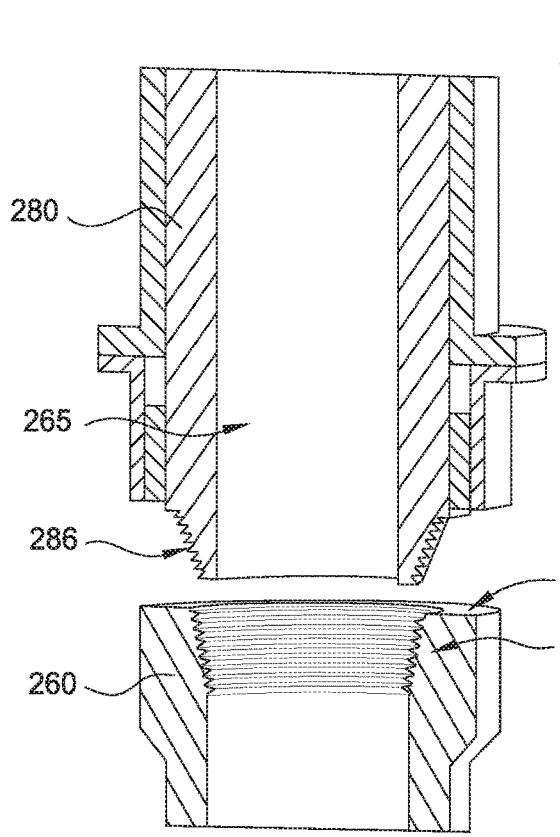
FIGS. 9A-9C illustrate coupling between a drive unit and a tool adapter of the top drive system of FIG. 7.
Figure 9B:
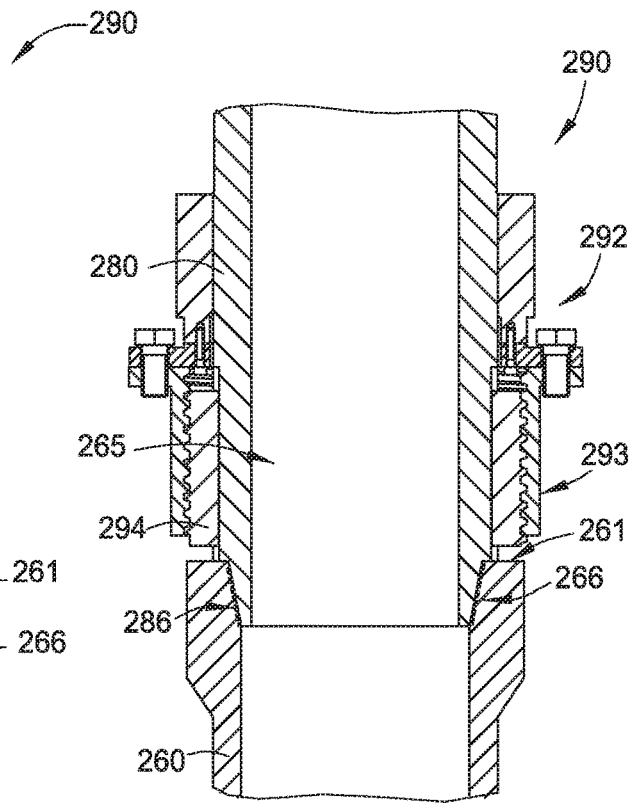

As before, coupling of drive unit 210 to tool adapter 250 may proceed as a multi-step process. In one embodiment, illustrated in FIGS. 9A-9B, the coupling begins with axial load coupling between drive stem 280 and tool stem 260. Drive stem 280 may be aligned with tool stem 260 so that a lower portion of drive stem 280 may be stabbed into tool stem 260. Drive stem 280 may rotate relative to tool stem 260 so that threaded coupling 286 on drive stem 280 engages and mates with threaded coupling 266 on tool stem 260 (FIG. 9B). Spindle unit 290 may remain fixed relative to drive stem 280 during axial load coupling. For example, annular motor 291 may reduce or prevent rotation of spindle unit 290 relative to drive stem 280 during axial load coupling. Counter nut 294 may be in a raised position relative to drive stem 280 during axial load coupling.

Motors 240 may provide torque to make up or break out the axial load connection between tool stem 260 and drive stem 280. Torque of drive stem 280 may cause threading (or unthreading, depending on direction) between tool stem 260 and drive stem 280. Threaded coupling 286 of drive stem 280 may be RH male threading, while threaded coupling 266 of tool stem 260 may be RH female threading. When tool stem 260 is coupled to drive stem 280, as shown in FIG. 9B, axial load may be transferred between the top drive and the tool. Likewise, when tool stem 260 is coupled to drive stem 280, central bore 265 may provide fluid communication between the top drive and the tool. It should be appreciated that, when tool stem 260 is coupled to drive stem 280, torque in the direction of the threaded couplings 286/266 may also be transferred between the top drive and the tool. For example, torque may be transferred from the motors 240 through shaft 235 to the drive gears 230, through drive gear profiles 285 to the drive stem 280, through the threaded couplings 286/266, to the tool stem 260, and to the tool string 2.

Figure 9C:
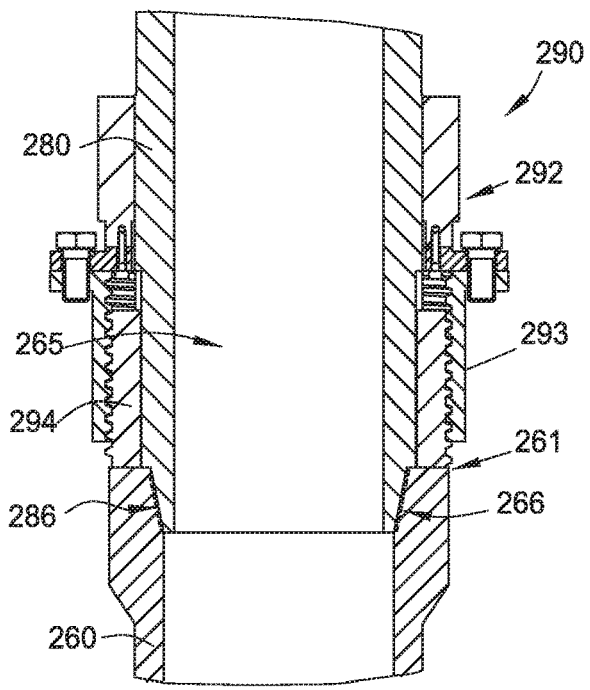

Coupling of drive unit 210 to tool adapter 250 may proceed with bi-directional torque coupling between drive stem 280 and tool stem 260, as illustrated in FIGS. 9B-9C. Annular motor 291 may rotate spindle 293 relative to drive stem 280. Annular motor 291 may thereby rotate spindle 293 relative to counter nut 294. Rotation of spindle 293 relative to counter nut 294 may cause vertical motion of counter nut 294 due to the threaded coupling between spindle 293 and counter nut 294 (e.g., threading 294-$t$ on counter nut 294) and the guided coupling between drive stem 280 and counter nut 294 (e.g., guide profile 294-$g$ on counter nut 294). During torque coupling, rotation of spindle 293 may continue until counter nut 294 contacts tool stem 260 (FIG. 9C). For example, counter nut 294 may contact shoulder 261 of tool stem 260. Shoulder 261 may be proximate a top of tool stem 260. During operation, engagement between counter nut 294 and shoulder 261 may be maintained, for example by a locking mechanism (e.g., hydraulic), and/or by continued torque from annular motor 291. In some embodiments, rotation of drive stem 280 in a direction ("loosening direction") that would break up or loosen the connection between threaded coupling 266 and threaded coupling 286 may thereby also force counter nut 294 downwards relative to drive stem 280. Once counter nut 294 contacts tool stem 260 (FIG. 9C), further rotation of drive stem 280 in the loosing direction may serve to transfer torque to tool stem 260. Likewise, rotation of drive stem 280 in the opposite direction ("tightening direction") may serve to transfer torque to tool stem 260 through the connection of threaded coupling 266 with threaded coupling 286.

De-coupling drive unit 210 from tool adapter 250 includes reverse rotation of spindle 293. Annular motor 291 may reverse the rotation of spindle 293, and thereby raising counter nut 294 relative to drive stem 280. Movement of counter nut 294 away from contact with tool stem 260 (FIG. 9B) allows rotation of drive stem 280 in the loosening direction to break up or loosen the connection between threaded coupling 266 and threaded coupling 286.

Figure 10:
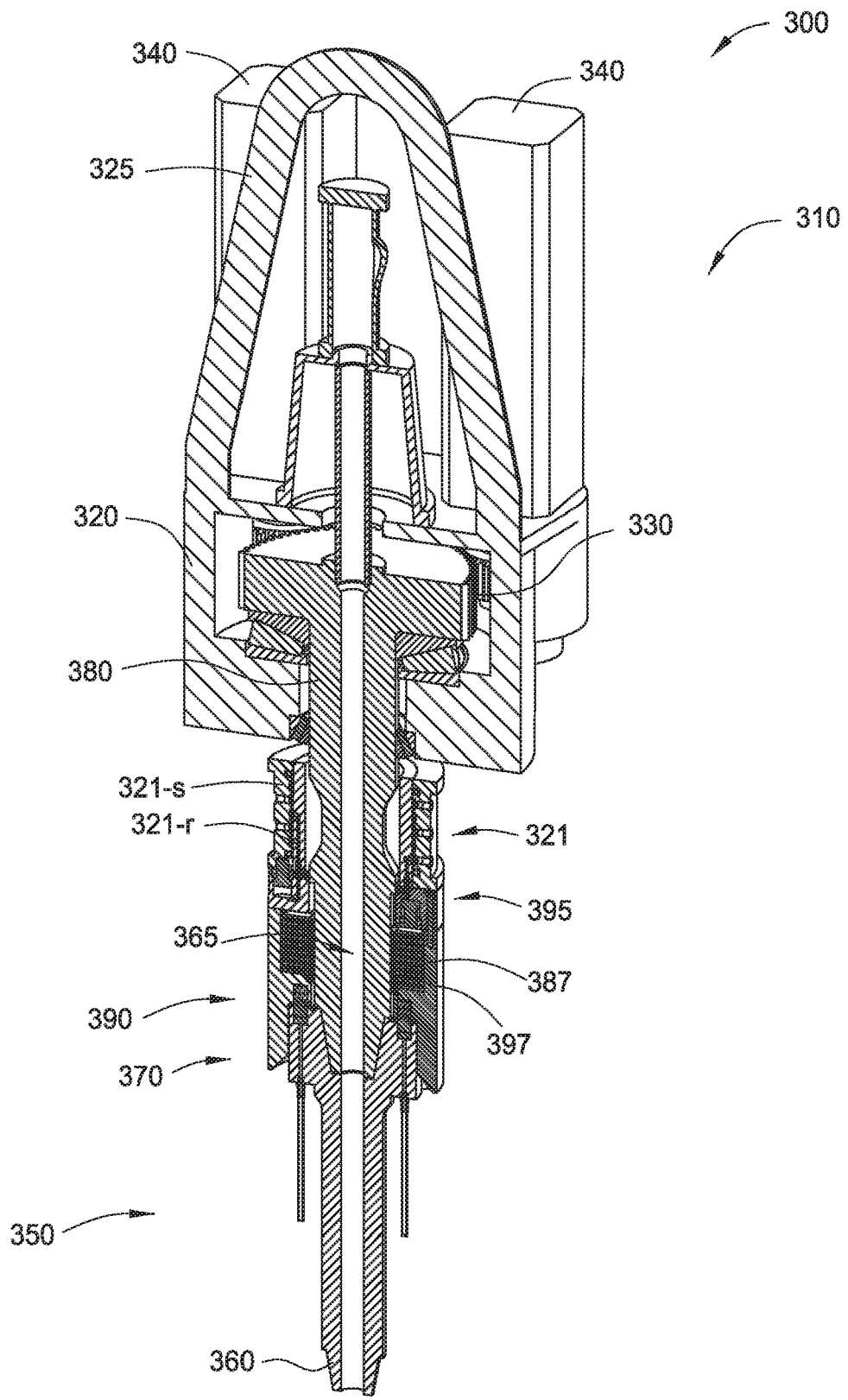
FIG. 10 illustrates a top drive system of the drilling system of FIG. 1.

FIG. 10 illustrates an alternative top drive system 300 according to embodiments described herein. Except as noted, top drive system 300 is configured and functions similarly to top drive system 100 and top drive system 200. For example, top drive system 300 includes a drive unit 310 and a tool adapter 350. The drive unit 310 generally includes a housing 320, becket 325, drive gears 330, motors 340, first portions of one or more couplings 370, and a drive stem 380. Rather than torque sleeve 190 or spindle unit 290, drive unit 310 includes a (torque) transmission unit 390. Rather than actuators 191 or annular motor 291, drive unit 310 includes a swivel 321 and a selection ring 395. The drive stem 380 may extend through an interior of torque transmission unit 390 and an interior of selection ring 395. At least a portion of swivel 321 may be fixed relative to the housing 320, and swivel 321 may encircle drive stem 380. For example, swivel 321 may include a stationary portion 321-$s$ that is fixed relative to housing 320 and a rotatable portion 321-$r$ that may rotate relative to housing 320. In some embodiments, the rotatable portion 321-$r$ may be rotationally fixed to selection ring 395. The stationary portion 321-$s$ may encircle the rotatable portion 321-$r$. Drive stem 380 may have friction surfaces 387 that parallel and may engage with friction surfaces 397 of transmission unit 390. The tool adapter 350 generally includes a tool stem 360 and second portions of the couplings 370. The tool stem 360 connects the top drive system 300 to the tool string 2. The tool stem 360 and drive stem 380 may share a central bore 365. When the drive unit 310 is coupled to the tool adapter 350, top drive system 300 may transfer bi-directional torque, load, power, data, and/or signals between the top drive and the tool.

Figure 11:
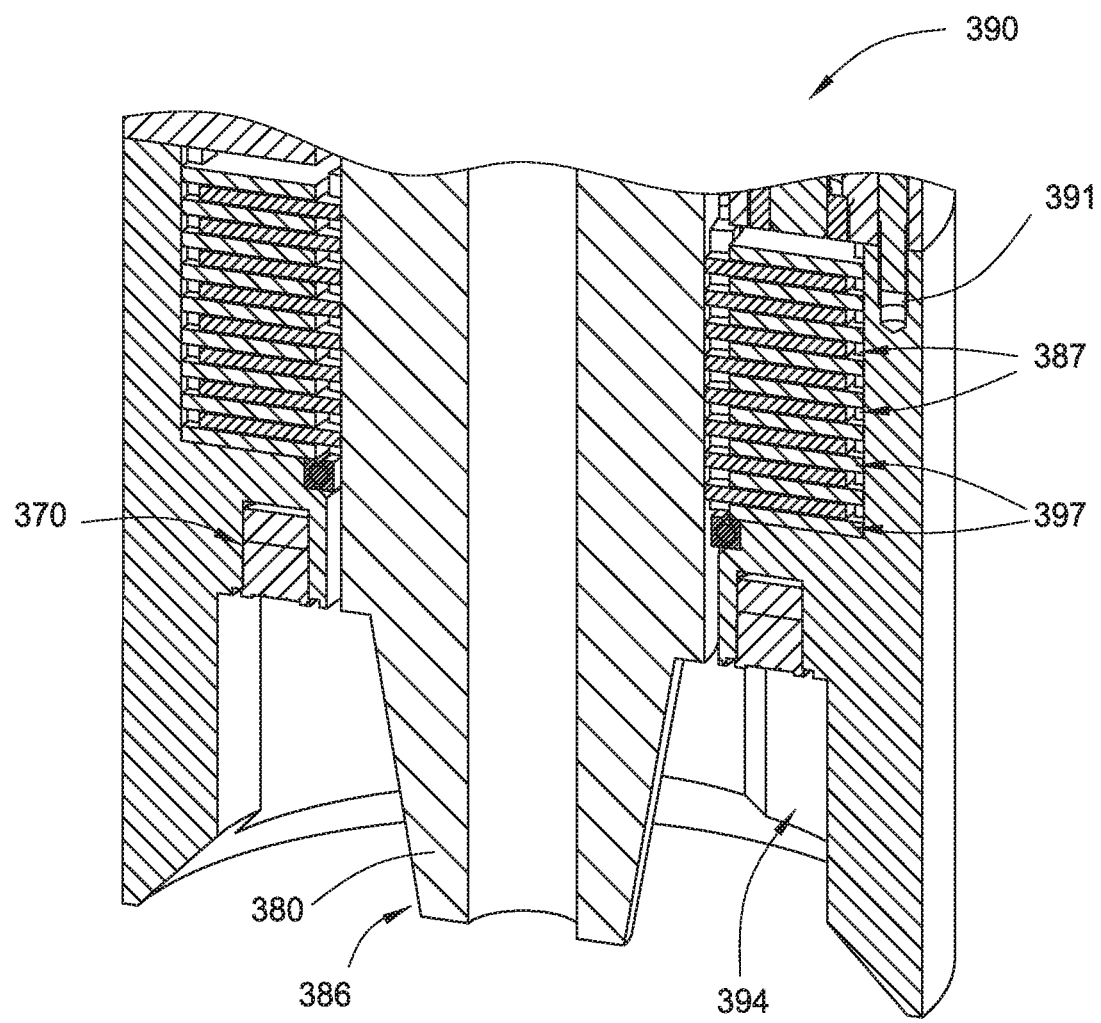
FIG. 11 illustrates a transmission unit of the top drive system of FIG. 10.

As illustrated in FIG. 11, transmission unit 390 generally includes couplings 370, one or more shoulders 394 proximate a bottom of the transmission unit 390, one or more coupling holes 391 proximate a top of the transmission unit 390, and one or more friction surfaces 397. The drive stem 380 may extend through the interior of transmission unit 390. Friction surfaces 387 of drive stem 380 may parallel and may engage with friction surfaces 397 of transmission unit 390. As illustrated, drive stem 380 includes eight disks projecting radially outward, each disk having two friction surfaces 387 (i.e., a top surface and a bottom surface). As illustrated, transmission unit 390 has nine annular disks encircling drive stem 380 and interleaved with the eight disks of the drive stem 380, each of the annular disks having one or two friction surfaces 397 (i.e., a top surface and a bottom surface). As would be understood by one of ordinary skill in the art with the benefit of this disclosure, other configurations of drive stem friction surfaces 387 and transmission unit friction surfaces 397 may be considered to accommodate manufacturing and operational conditions. Friction surfaces 387/397 may be selectively engaged. For example, a transmission selector 393 (FIG. 12) from selection ring 395 may be actuated (e.g., hydraulically) to apply a compressive (normal) force to the interleaved friction surfaces 387/397. Engagement of friction surfaces 387 with friction surfaces 397 may rotationally couple drive stem 380 with transmission unit 390. Also illustrated in FIG. 11, a portion of the exterior of drive stem 380 may include a threaded coupling 386. Shoulders 394 may convey torque between transmission unit 390 and tool stem 360. As illustrated, shoulders 394 may be disposed on an interior surface of transmission unit 390. Complementary shoulders 364 may be disposed on an exterior surface of tool stem 360 (FIG. 13A). The shoulders 394/364 may have guiding chamfers. It should be appreciated that other torque coupling types and/or configurations may be considered to accommodate manufacturing and operational conditions.

Figure 12A:
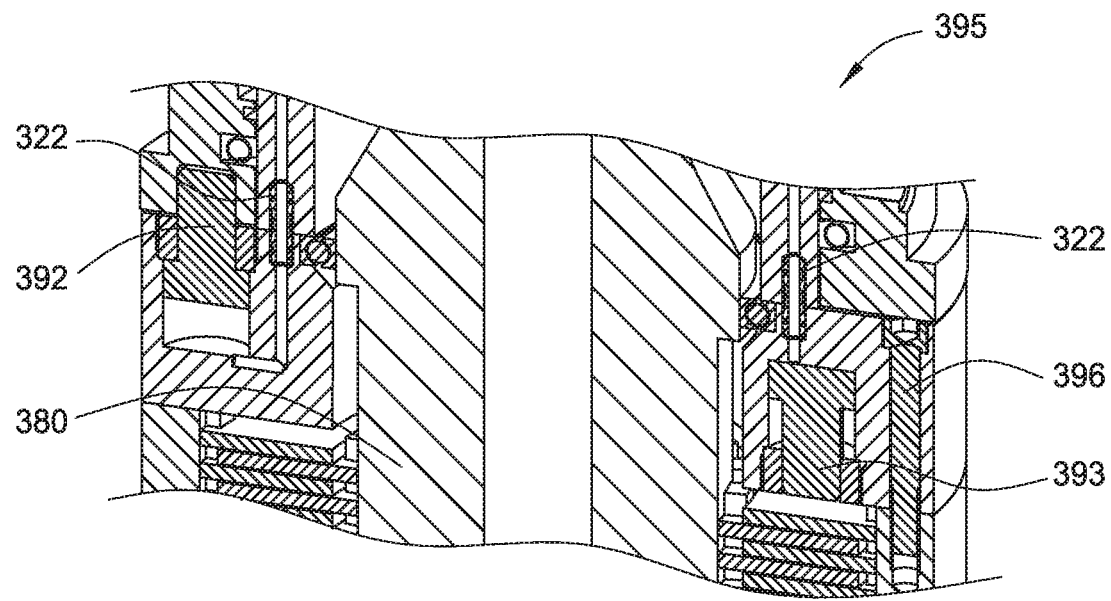
FIGS. 12A-12B illustrates a selection ring of the top drive system of FIG. 10.
Figure 12B:
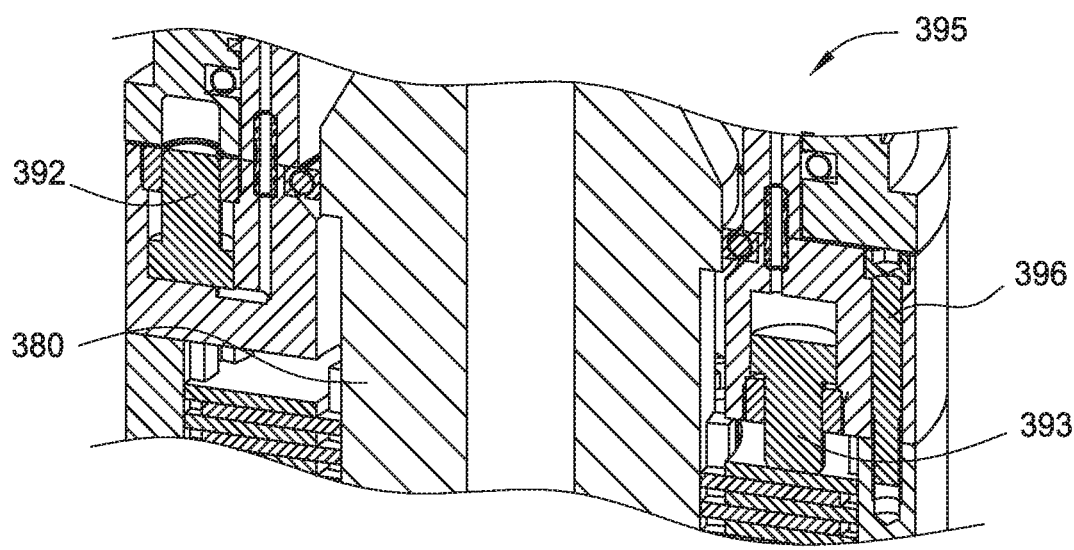
Figure 13A:
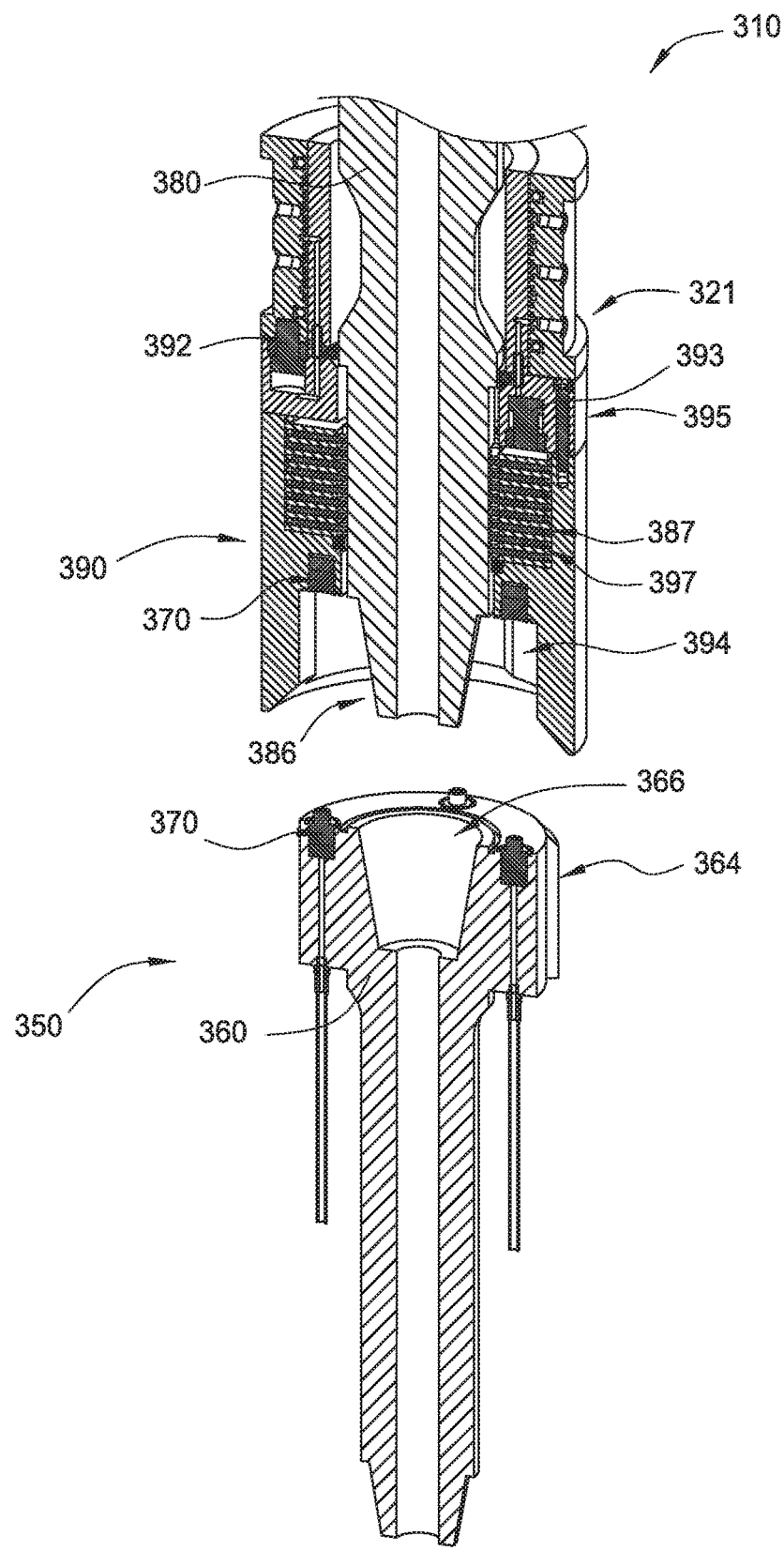
FIGS. 13A-13E illustrate coupling between a drive unit and a tool adapter of the top drive system of FIG. 10.

As illustrated in FIGS. 12A-12B, selection ring 395 includes one or more coupling pins 396 engagable with coupling holes 391 of transmission unit 390, one or more swivel selector 392 and one or more transmission selector 393. The coupling pins 396 may be actuated (e.g., hydraulically) to engage with coupling holes 391, thereby rotationally fixing selection ring 395 with transmission unit 390. Each selector 392/393 may be movable to an "on" position or an "off" position. The drive stem 380 may extend through an interior of selection ring 395. When swivel selector 392 is "on", selection ring 395 may move synchronously with stationary portion 321-$s$ of swivel 321. For example, swivel selector 392 may include a pin that moves between an upper position (FIG. 12A) and a lower position (FIG. 12B). When the pin of swivel selector 392 is in the upper position, the swivel selector 392 is "on", and selection ring 395 may move synchronously with stationary portion 321-$s$ of swivel 321. Likewise, transmission selector 393 may include a pin that moves between an upper position (FIG. 12A) and a lower position (FIG. 12B). Transmission selector 393 may engage transmission unit friction surfaces 397 with drive stem friction surfaces 387. For example, transmission selector 393 may compress transmission unit friction surfaces 397 against drive stem friction surfaces 387. When the pin of transmission selector 393 is in the lower position, the transmission selector 393 is "on", and friction surfaces 387 may engage with friction surfaces 397 to rotationally couple drive stem 380 with transmission unit 390. Likewise, when transmission unit friction surfaces 397 are engaged with drive stem friction surfaces 387, rotation of drive stem 380 may transmit torque to transmission unit 390. It should be appreciate that coupling pins 396 will be engaged with coupling holes 391 whenever transmission selector 393 is in the "on" position. Consequently, when the transmission selector 393 is "on", selection ring 395 may move synchronously with transmission unit 390. In some embodiments, swivel selector 392 and transmission selector 393 may be a single unit. In some embodiments, swivel selector 392 and/or transmission selector 393 may include or be actuated by a hydraulic cylinder. As would be understood by one of ordinary skill in the art with the benefit of this disclosure, other configurations of swivel selectors 392 and transmission selectors 393 may be considered to accommodate manufacturing and operational conditions.

In some embodiments, rather than coupling holes 391 in transmission unit 390 and coupling pins 396 of selection ring 395, transmission unit 390 may simply be fixed to selection ring 395. It should be appreciated that coupling holes 391 and coupling pins 396 may be beneficial for maintenance purposes.

Figure 13B:
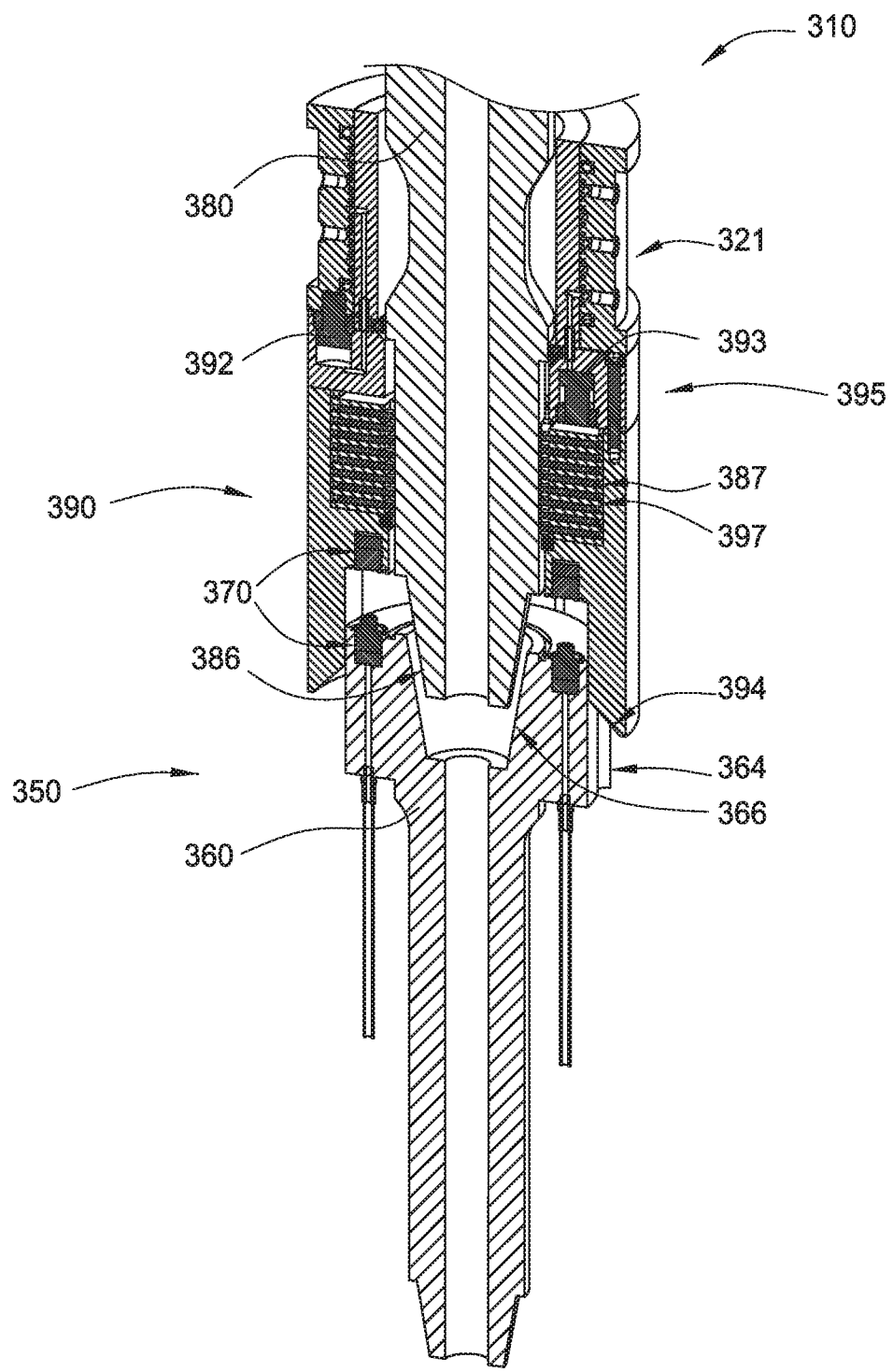
Figure 13C:
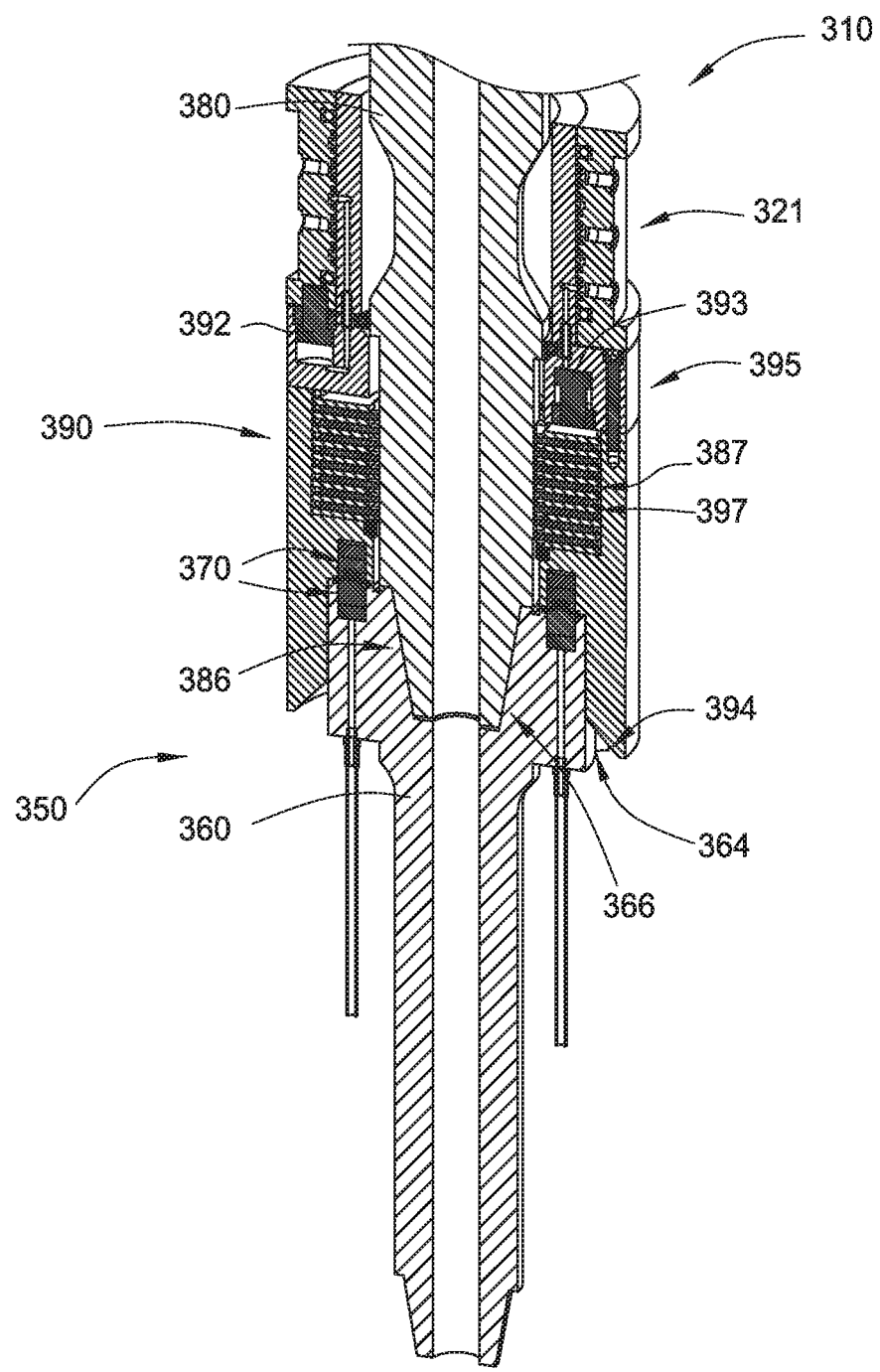

As before, coupling of drive unit 310 to tool adapter 350 may proceed as a multi-step process. In one embodiment, illustrated in FIGS. 13A-13C, the coupling begins with axial load coupling between drive stem 380 and tool stem 360. Drive stem 380 may be aligned with tool stem 360 so that a lower portion of drive stem 380 may be stabbed into tool stem 360. Transmission unit 390 may also be aligned with tool stem 360 so that shoulders 394 align with corresponding shoulders 364 on tool stem 360. For example, shoulders 394 may include concave features on an interior surface of transmission unit 390, while corresponding shoulders 364 include convex features on an exterior surface of tool stem 360. In some embodiments, as illustrated in FIG. 12B, transmission selector 393 may be initially moved to "on," swivel selector 392 may be initially moved to "off," and coupling pins 396 may engage coupling holes 391, so that rotation of drive stem 380 may be used to align transmission unit 390 with tool stem 360. Once transmission unit 390 is aligned with tool stem 360, transmission selector 393 may then be moved to "off" to allow free rotation of drive stem 380 relative to transmission unit 390. Drive stem 380 may rotate relative to tool stem 360 so that threaded coupling 386 on drive stem 380 engage and mate with threaded coupling 366 on tool stem 360 (FIGS. 13B-13C). In some embodiments, transmission unit 390 may remain fixed relative to housing 320 during axial load coupling. For example, swivel selector 392 may be set to "on" and coupling pins 396 may engage coupling holes 391 during axial load coupling. Selection ring 395 may thereby synchronize with stationary portion 321-s of swivel 321, which may be fixed relative to the housing 320. Likewise, transmission selector 393 may be "off" during axial load coupling, so transmission unit friction surfaces 397 may not be engaged with drive stem friction surfaces 387. Consequently, transmission unit 390 may not rotate with drive stem 380 during axial load coupling.

Motors 340 may provide torque to make up or break out the axial load connection between tool stem 360 and drive stem 380. Torque of drive stem 380 may cause threading (or unthreading, depending on direction) between tool stem 360 and drive stem 380. Threaded coupling 386 of drive stem 380 may be RH male threading, while threaded coupling 366 of tool stem 260 may be RH female threading. When tool stem 360 is coupled to drive stem 380, as shown in FIG. 13C, axial load may be transferred between the top drive and the tool. Likewise, when tool stem 360 is coupled to drive stem 380, central bore 365 may provide fluid communication between the top drive and the tool. When tool stem 360 is coupled to drive stem 380, as shown in FIG. 13C, couplings 370 may communicate pneumatic, hydraulic, electrical, optical, or other power and/or signals between drive unit 310 and tool adapter 350. In some embodiments, swivel 321 may provide torque to make up or break out the threaded coupling 366. For example, a rotational actuator may be coupled between housing 320 and stationary portion 321-s of swivel 321. Stationary portion 321-s may not be rotationally fixed to housing 320, but may have some rotational freedom of movement (e.g., less than about 60 degrees). In such embodiments, swivel 321 may be used as a wrenching tong for make up if the motors 340 cannot apply sufficient torque.

Figure 13D:
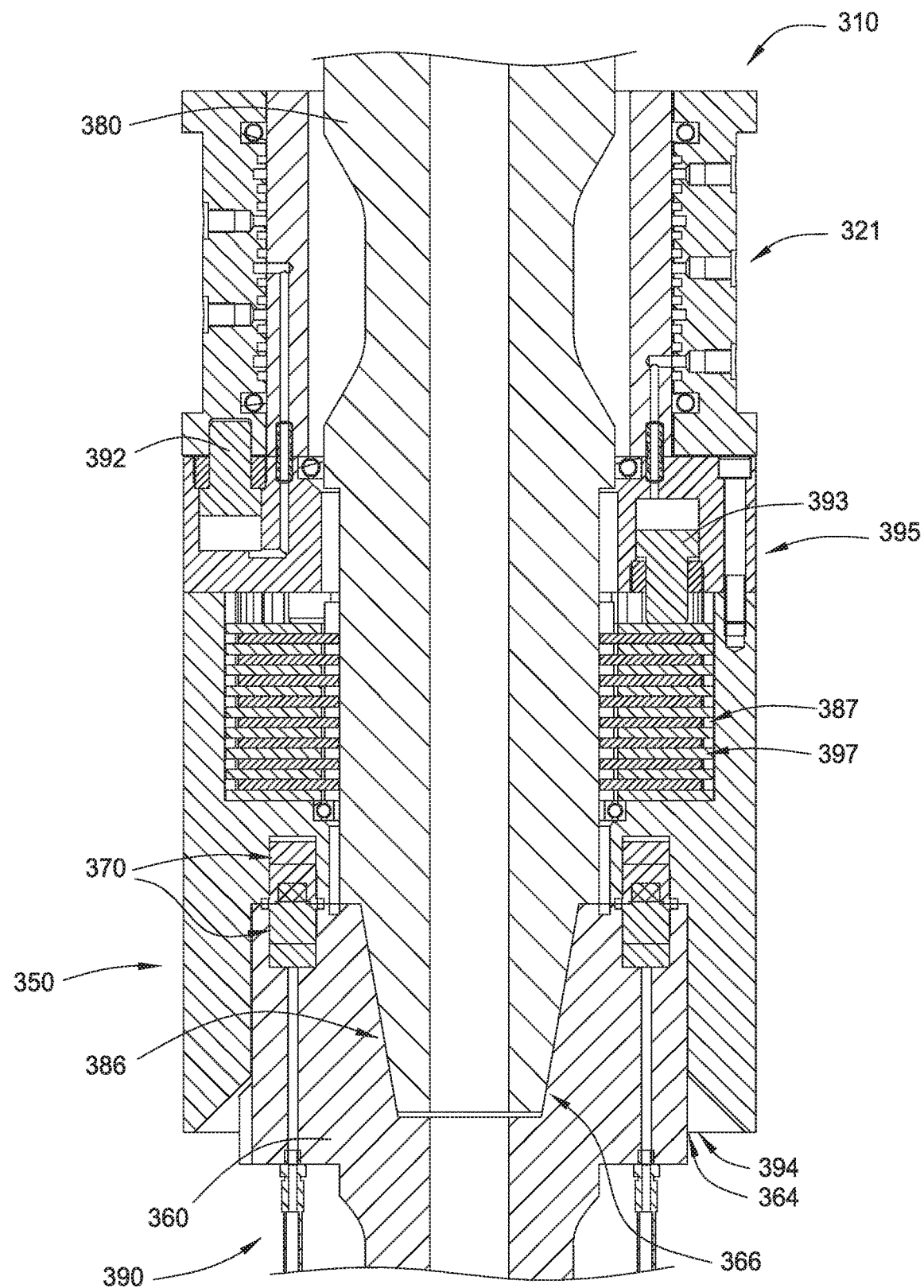
Figure 13E:
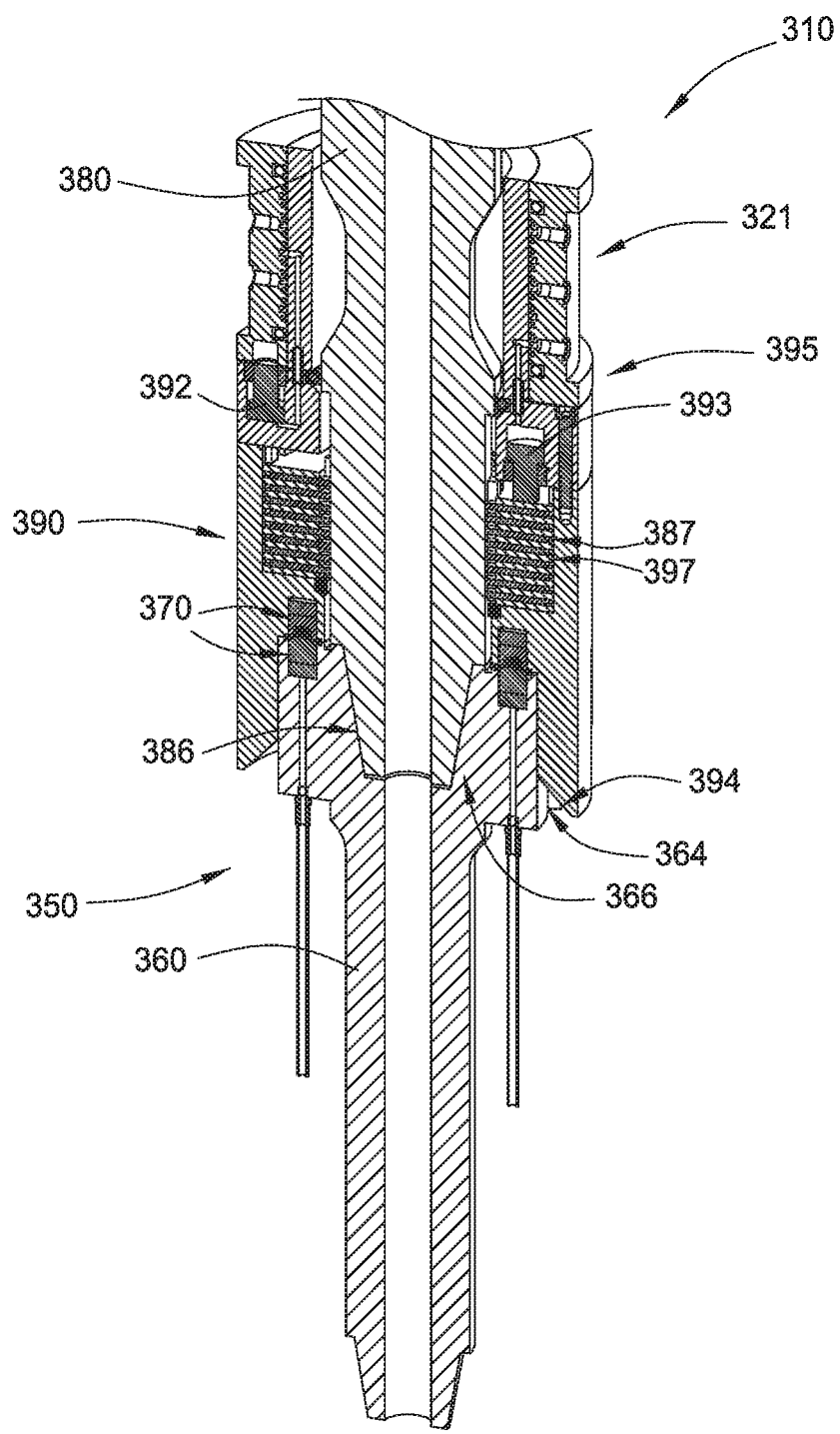

Coupling of drive unit 310 to tool adapter 350 may proceed with bi-directional torque coupling between drive stem 380 and tool stem 360, as illustrated in FIGS. 13C-13E. Shoulders 394 on transmission unit 390 may align and mate with corresponding shoulders 364 on tool stem 360. It should be appreciated that, immediately following axial load coupling, residual torque may exist in tool string 2. Drive stem 380 may counter the residual torque while making-up threaded coupling 366 (FIGS. 13B-13C). In some embodiments, drive stem 380 may be rotationally coupled to transmission unit 390 following axial load coupling to further counter the residual torque. For example, transmission selector 393 may be moved to "on," while swivel selector 392 may remain "on," and coupling pins 396 may continue engage coupling holes 391 (FIG. 13D). Selection ring 395 may then safely switch from having swivel selector 392 "on" (FIGS. 13A-13D) to having swivel selector 392 "off" (FIG. 13E). For example, residual torque may be transferred from tool string 2 through tool stem 360 to shoulders 364, to shoulders 394, and to transmission unit 390. With transmission selector 393 "on," swivel selector 392 "off," and coupling pins 396 engaged with coupling holes 391, selection ring 395 and transmission unit 390 may both rotationally synchronize with drive stem 380. Drive stem 380 may thereby counter any residual torque from tool string 2. Likewise, once shoulders 394 mate with corresponding shoulders 364, and once transmission selector 393 is "on", as shown in FIG. 13E, bi-directional torque may be transferred between the top drive and the tool. For example, torque may be transferred from the motors 340 through shaft 335 (not shown) to the drive gears 330, to the drive stem 380, through the friction surfaces 387/397 to the transmission unit 390, through the mated shoulders 394/364 to tool stem 360, and to the tool string 2. Bi-directional torque may be thereby transferred from the motors 340 of the drive unit 310 to the tool stem 360, and thus to the tool string 2.

In some embodiments, coupling drive unit 310 to tool adapter 350 may be facilitated with various sensors, cameras, actuators, couplers, and/or adapters. For example, signals and/or power may be transferred between the rotatable portion 321-r of swivel 321 and the selection ring 395 by connections 322 (FIG. 12). In some embodiments, swivel selector 392 and transmission selector 393 are hydraulic cylinders, and connections 322 may provide hydraulic control signals to swivel selector 392 and transmission selector 393. As another example, signals and/or power may be transferred between transmission unit 390 and tool stem 360 by couplings 370.

As another example, coupling drive unit 310 to tool adapter 350 may be facilitated with sensors to detect misalignments between components. For example, in the illustrated embodiment, when swivel selector 392 is "on" (FIG. 13A), swivel selector 392 extends from selection ring 395 into a recess of swivel 321. Rotational misalignment of selection ring 395 and swivel 321 would not allow swivel selector 392 to extend from selection ring 395 into the recess of swivel 321. A sensor (e.g., an optical sensor) may be disposed on an upper portion of selection ring 395 to detect orientation relative to swivel 321. Appropriate alignment of selection ring 395 with swivel 321 may be achieved prior to actuating swivel selector 392. As another example, transmission unit 390 may be first oriented relative to tool stem 360 so that shoulders 394 align with shoulders 364. A sensor (e.g., an optical sensor) may be disposed at the base of transmission unit 390. The sensor may be configured to detect a marker (e.g., a reflector) disposed at the top of tool stem 360. Transmission unit 390 may be rotated relative to tool stem 360 until the sensor detects alignment with the marker. In some embodiments, multiple markers may be utilized. For example, transmission unit 390 may be appropriately oriented in two or more orientations relative to tool stem 360. The sensor need only detect alignment with the first marker to identify appropriate orientation of transmission unit 390 relative to tool stem 360.

As another example, coupling drive unit 310 to tool adapter 350 may be facilitated with adapters to allow for slight misalignments between components. For example, connections 322 may include a retractable adapter that allows for slight misalignments. In some embodiments, adapters may allow for connection 322 to be made between the rotatable portion 321-r of swivel 321 and selection ring 395 even with slight rotational and/or positional misalignment. Once connection 322 has been made, the adapter may maintain connection 322 f while selection ring 395 moves synchronously with swivel 321, even if a slight misalignment develops.

As another example, coupling drive unit 310 to tool adapter 350 may be facilitated with remote control actuators. For example, swivel selector 392 and/or transmission selector 393 may be remotely controlled.

It should be appreciated that, for each top drive system 100, 200, 300, other sensors, actuators, and/or adapters types and/or configurations may be considered to accommodate manufacturing and operational conditions. The actuators may be, for example, worm drives, hydraulic cylinders, compensation cylinders, etc. The actuators may be hydraulically, pneumatically, electrically, and/or manually controlled. In some embodiments, multiple control mechanism may be utilized to provide redundancy. One or more sensors may be used to monitor relative positions of the components of the top drive system. The sensors may be position sensors, rotation sensors, pressure sensors, optical sensors, magnetic sensors, etc. In some embodiments, stop surfaces may be used in conjunction with or in lieu of sensors to identify when components are appropriately positioned and/or oriented. Likewise, optical guides may be utilized to identify or confirm when components are appropriately positioned and/or oriented. In some embodiments, guide elements (e.g., pins and holes, chamfers, etc.) may assist in aligning and/or orienting the components of the top drive system 100, 200, 300. Bearings and seals may be disposed between components to provide support, cushioning, rotational freedom, and/or fluid management.

In an embodiment, a drive unit of a top drive system includes a drive stem having a torque gear profile and a load coupling, wherein the load coupling is a threaded coupling; and a torque sleeve movable between a first position and a second position, and having a sleeve gear profile that engages the torque gear profile when the torque sleeve is in the second position.

In one or more embodiments disclosed herein, the first position of the torque sleeve is a raised position, and the second position of the torque sleeve is a lowered position.

In one or more embodiments disclosed herein, the drive stem comprises a drive gear profile engagable with the motor.

In one or more embodiments disclosed herein, the drive stem extends through an interior of the torque sleeve.

In one or more embodiments disclosed herein, the drive unit also includes a swivel co-axial with the drive stem.

In one or more embodiments disclosed herein, the swivel is a hydraulic swivel.

In one or more embodiments disclosed herein, the drive unit also includes an actuator configured to move the torque sleeve between the first position and the second position.

In one or more embodiments disclosed herein, the actuator is a hydraulic cylinder.

In one or more embodiments disclosed herein, the top drive system also includes a tool adapter having a complementary load coupling to the load coupling of the drive stem, and a stem gear profile that is complementary to the sleeve gear profile.

In one or more embodiments disclosed herein, the top drive system also includes at least one coupling between the drive unit and the tool adapter selected from a group consisting of: threaded couplings, hydraulic couplings, pneumatic couplings, electronic couplings, fiber optic couplings, power couplings, data couplings, signal couplings, bi-directional torque couplings, axial load couplings, power couplings, data couplings, and signal couplings.

In an embodiment, a method of coupling a drive unit to a tool adapter includes positioning the tool adapter below the drive unit; rotating a drive stem of the drive unit to make up a threaded coupling with a tool stem of the tool adapter; and moving a torque sleeve of the drive unit to engage both a torque gear profile of the drive stem and a stem gear profile of the tool stem.

In one or more embodiments disclosed herein, moving the torque sleeve comprises moving the torque sleeve from a raised position to a lowered position.

In one or more embodiments disclosed herein, the method also includes forming a coupling between the drive unit and the tool adapter, wherein the coupling is selected from a group consisting of: threaded couplings, hydraulic couplings, pneumatic couplings, electronic couplings, fiber optic couplings, power couplings, data couplings, signal couplings, bi-directional torque couplings, axial load couplings, power couplings, data couplings, and signal couplings.

In one or more embodiments disclosed herein, the method also includes transferring torque from the drive stem through the torque sleeve to the tool stem.

In one or more embodiments disclosed herein, the method also includes transferring axial load with the threaded coupling between the drive stem and the tool stem.

In an embodiment, a drive unit of a top drive system includes a drive stem having a load coupling that is a threaded coupling; a spindle unit comprising: an interior through which the drive stem extends; a counter nut having a first guide profile mated with a second guide profile on the drive stem; and a spindle having threading mated with threading on the counter nut; and an annular motor operationally coupled to the spindle unit.

In one or more embodiments disclosed herein, the annular motor comprises a fixed portion that is fixed to the drive stem and a rotatable portion that is rotatable relative to the drive stem.

In one or more embodiments disclosed herein, the rotatable portion is rotationally coupled to the spindle.

In one or more embodiments disclosed herein, the first guide profile is on an interior surface of the counter nut and the threading is on an exterior surface of the counter nut.

In one or more embodiments disclosed herein, the drive unit also includes a motor, wherein the drive stem comprises a drive gear profile engagable with the motor.

In one or more embodiments disclosed herein, at least a portion of the annular motor is fixed relative to the drive stem.

In one or more embodiments disclosed herein, the top drive system also includes a tool adapter having a complementary load coupling to the load coupling of the drive stem, and a shoulder proximate a top of the tool adapter.

In one or more embodiments disclosed herein, the top drive system also includes at least one coupling between the drive unit and the tool adapter selected from a group consisting of: threaded couplings, hydraulic couplings, pneumatic couplings, electronic couplings, fiber optic couplings, power couplings, data couplings, signal couplings, bi-directional torque couplings, axial load couplings, power couplings, data couplings, and signal couplings.

In an embodiment, a method of coupling a drive unit to a tool adapter includes positioning the tool adapter below the drive unit; rotating a drive stem of the drive unit to make up a threaded coupling with a tool stem of the tool adapter; and rotating a spindle unit relative to the drive stem to contact a counter nut of the spindle unit with the tool stem.

In one or more embodiments disclosed herein, the spindle unit remains fixed relative to the drive stem while rotating the drive stem to make up the threaded coupling.

In one or more embodiments disclosed herein, rotating the spindle unit relative to the drive stem moves the counter nut vertically relative to the drive stem.

In one or more embodiments disclosed herein, the method also includes forming a coupling between the drive unit and the tool adapter, wherein the coupling is selected from a group consisting of: threaded couplings, hydraulic couplings, pneumatic couplings, electronic couplings, fiber optic couplings, power couplings, data couplings, signal couplings, bi-directional torque couplings, axial load couplings, power couplings, data couplings, and signal couplings.

In one or more embodiments disclosed herein, the method also includes transferring bi-directional torque with the threaded coupling between the drive stem and the tool stem.

In one or more embodiments disclosed herein, the method also includes transferring axial load with the threaded coupling between the drive stem and the tool stem.

In an embodiment, a drive unit of a top drive system includes a drive stem having first friction surfaces and a load coupling, wherein the load coupling is a threaded coupling; a transmission unit having: second friction surfaces parallel to the first friction surfaces; and shoulders proximate a bottom of the transmission unit; and a transmission selector movable to an "on" position or an "off" position, wherein the drive stem moves synchronously with the transmission unit when the transmission selector is in the "on" position.

In one or more embodiments disclosed herein, the drive unit also includes a swivel selector movable to an "on" position or an "off" position, wherein the transmission unit moves synchronously with a swivel of the drive unit when the swivel selector is in the "on" position.

In one or more embodiments disclosed herein, the swivel comprises a stationary portion and a rotatable portion, and the swivel selector couples to the stationary portion.

In one or more embodiments disclosed herein, the drive unit also includes a selection ring that includes the transmission selector.

In one or more embodiments disclosed herein, the selection ring comprises coupling pins, and the transmission unit comprises coupling holes engagable with the coupling pins.

In one or more embodiments disclosed herein, the first friction surfaces are top and bottom surfaces of disks projecting radially outward on the drive stem, and the second friction surfaces are top and bottom surfaces of annular disks encircling the drive stem.

In one or more embodiments disclosed herein, the top drive system also includes a tool adapter having a complementary load coupling to the load coupling of the drive stem, and shoulders complementary to those of the transmission unit.

In one or more embodiments disclosed herein, the top drive system also includes at least one coupling between the drive unit and the tool adapter selected from a group consisting of: threaded couplings, hydraulic couplings, pneumatic couplings, electronic couplings, fiber optic couplings, power couplings, data couplings, signal couplings, bi-directional torque couplings, axial load couplings, power couplings, data couplings, and signal couplings.

In one or more embodiments disclosed herein, the shoulders of the transmission unit are on an interior surface of the transmission unit, and the shoulders of the tool adapter are on an exterior surface of a tool stem of the tool adapter.

In an embodiment, a method of coupling a drive unit to a tool adapter includes positioning the tool adapter below the drive unit so that shoulders of a transmission unit of the drive unit align with shoulders of a tool stem of the tool adapter; and rotating a drive stem of the drive unit to make up a threaded coupling with the tool stem, wherein: the drive stem and the transmission unit rotate together during the positioning of the tool adapter; and the drive stem and the transmission unit do not rotate together during the making up of the threaded coupling.

In one or more embodiments disclosed herein, the method also includes, before making up the threaded coupling, moving a swivel selector to an "on" position to rotationally couple the transmission unit with a housing of the drive unit.

In one or more embodiments disclosed herein, the method also includes rotating a portion of a swivel relative to the housing to wrench the threaded coupling.

In one or more embodiments disclosed herein, the method also includes, after making up the threaded coupling, moving a transmission selector to an "on" position.

In one or more embodiments disclosed herein, the method also includes, after moving the transmission selector to the "on" position, moving a swivel selector to an "off" position.

In one or more embodiments disclosed herein, the method also includes forming a coupling between the drive unit and the tool adapter, wherein the coupling is selected from a group consisting of: threaded couplings, hydraulic couplings, pneumatic couplings, electronic couplings, fiber optic couplings, power couplings, data couplings, signal couplings, bi-directional torque couplings, axial load couplings, power couplings, data couplings, and signal couplings.

In one or more embodiments disclosed herein, the method also includes transferring torque from the drive stem to the transmission unit through frictional surfaces.

In one or more embodiments disclosed herein, the method also includes mating the shoulders of the transmission unit with the shoulders of the tool stem to transfer torque from the drive stem to the tool stem.

In one or more embodiments disclosed herein, the method also includes transferring axial load with the threaded coupling between the drive stem and the tool stem.

While the foregoing is directed to embodiments of the present invention, other and further embodiments of the invention may be devised without departing from the basic scope thereof, and the scope thereof is determined by the claims that follow.

The invention claimed is:

1. A top drive system, comprising:
a drive stem having first friction surfaces and a load coupling, wherein the load coupling is a threaded coupling;
a swivel disposed about the drive stem;
a transmission unit having:
second friction surfaces parallel to the first friction surfaces; and
shoulders proximate a bottom of the transmission unit;
a transmission selector movable to an "on" position or an "off" position, wherein the drive stem moves synchronously with the transmission unit when the transmission selector is in the "on" position; and
a swivel selector movable to an "on" position or an "off" position, wherein the transmission unit moves synchronously with the swivel when the swivel selector is in the "on" position.

2. The top drive system of claim 1, wherein the swivel comprises a stationary portion and a rotatable portion, and the swivel selector couples to the stationary portion.

3. The top drive system of claim 1, further comprising a selection ring that includes the transmission selector.

4. The top drive system of claim 3, wherein the selection ring comprises coupling pins, and the transmission unit comprises coupling holes engagable with the coupling pins.

5. The top drive system of claim 1, wherein the first friction surfaces are top and bottom surfaces of disks projecting radially outward on the drive stem, and the second friction surfaces are top and bottom surfaces of annular disks encircling the drive stem.

6. The top drive system of claim 1, further comprising a tool adapter having a complimentary load coupling to the load coupling of the drive stem, and shoulders complimentary to those of the transmission unit.

7. The top drive system of claim 6, further comprising at least one coupling between the transmission unit and the tool adapter selected from a group consisting of: hydraulic couplings, pneumatic couplings, electronic couplings, fiber optic couplings, power couplings, data couplings, signal couplings, bi-directional torque couplings, axial load couplings, and signal couplings.

8. The top drive system of claim 6, wherein the shoulders of the transmission unit are on an interior surface of the transmission unit, and the shoulders of the tool adapter are on an exterior surface of a tool stem of the tool adapter.

9. A method of coupling a drive unit to a tool adapter comprising:
positioning the tool adapter below the drive unit so that shoulders of a transmission unit of the drive unit align with shoulders of a tool stem of the tool adapter; and
rotating a drive stem of the drive unit to make up a threaded coupling with the tool stem, wherein:
the drive stem and the transmission unit rotate together during the positioning of the tool adapter; and
the drive stem and the transmission unit do not rotate together during the making up of the threaded coupling.

10. The method of claim 9, further comprising, before making up the threaded coupling, moving a swivel selector to an "on" position to rotationally couple the transmission unit with a housing of the drive unit.

11. The method of claim 10, further comprising rotating a portion of a swivel relative to the housing to wrench the threaded coupling.

12. The method of claim 9, further comprising, after making up the threaded coupling, moving a transmission selector to an "on" position.

13. The method of claim 12, further comprising, after moving the transmission selector to the "on" position, moving a swivel selector to an "off" position.

14. The method of claim 9, further comprising forming a coupling between the drive unit and the tool adapter, wherein the coupling is selected from a group consisting of: threaded couplings, hydraulic couplings, pneumatic couplings, electronic couplings, fiber optic couplings, power couplings, data couplings, signal couplings, bi-directional torque couplings, axial load couplings, power couplings, data couplings, and signal couplings.

15. The method of claim 9, further comprising transferring torque from the drive stem to the transmission unit through frictional surfaces.

16. The method of claim 9, further comprising mating the shoulders of the transmission unit with the shoulders of the tool stem to transfer torque from the drive stem to the tool stem.

17. The method of claim 9, further comprising transferring axial load with the threaded coupling between the drive stem and the tool stem.

18. A of a top drive system, comprising:
a drive stem having first friction surfaces and a load coupling, wherein the load coupling is a threaded coupling;
a transmission unit having:
second friction surfaces parallel to the first friction surfaces; and
shoulders proximate a bottom of the transmission unit;
a transmission selector movable to an "on" position or an "off" position, wherein the drive stem moves synchronously with the transmission unit when the transmission selector is in the "on" position; and
a tool adapter having a complimentary load coupling to the load coupling of the drive stem, and shoulders complimentary to those of the transmission unit;
wherein the shoulders of the transmission unit are on an interior surface of the transmission unit, and the shoulders of the tool adapter are on an exterior surface of a tool stem of the tool adapter.

19. The top drive system of claim 18, further comprising:
a swivel selector movable to an "on" position or an "off" position, wherein the transmission unit moves synchronously with a swivel when the swivel selector is in the "on" position.

20. The top drive system of claim 19, wherein the swivel comprises a stationary portion and a rotatable portion, and the swivel selector couples to the stationary portion.

\* \* \* \* \*